(12) United States Patent
Khazaei et al.

(10) Patent No.: US 6,931,034 B2
(45) Date of Patent: Aug. 16, 2005

(54) FEEDBACK MECHANISMS FOR STABILIZING A LASER SYSTEM

(75) Inventors: Hamid R. Khazaei, Westford, MA (US); Harmeet Singh, Acton, MA (US); Emily M. Squires, Littleton, MA (US); David Kirk Lewis, Maynard, MA (US)

(73) Assignee: Optovia Corporation, Acton, MA (US)

( * ) Notice: Subject to any disclaimer, the term of this patent is extended or adjusted under 35 U.S.C. 154(b) by 73 days.

(21) Appl. No.: 10/642,016

(22) Filed: Aug. 15, 2003

(65) Prior Publication Data

US 2005/0036527 A1 Feb. 17, 2005

(51) Int. Cl.$^7$ ............................................. H01S 3/10
(52) U.S. Cl. .......................... 372/9; 372/6; 372/69; 372/102
(58) Field of Search ............................. 372/9, 69, 102

(56) References Cited

U.S. PATENT DOCUMENTS

| | | | |
|---|---|---|---|
| 5,351,262 A | 9/1994 | Poguntke et al. | 372/102 |
| 6,052,394 A * | 4/2000 | Lee et al. | 372/6 |
| 6,212,310 B1 * | 4/2001 | Waarts et al. | 385/24 |
| 6,282,214 B1 | 8/2001 | Goto et al. | 372/20 |
| 6,359,913 B1 | 3/2002 | Lodenkamper | 372/18 |

OTHER PUBLICATIONS

C. N. Man et al., "Injection locking of argon–ion lasers", Optics Letters, vol. 9, No. 8, Aug. 1984, pp. 333–334.
Charles H. Henry et al., "Instability of Semiconductor Lasers Due to Optical Feedback from Distant Reflectors", IEEE Journal Of Quantum Electronics, vol. QE–22, No. 2, Feb. 1986, pp. 131–138.
Rogerio T. Ramos et al., "Optical injection locking and phase–lock loop combined systems", Optics Letters, vol. 19, No. 1, Jan. 1, 1994, pp. 4–6.
H. Takahashist et al., "Transmission Characteristics of Arrayed Waveguide NxN Waveguide Multiplexer", Journal of Lightwave Technology, vol. 13, No. 3, Mar. 1995, pp. 446–455, cited at pp. 34 and 68 of the specification.
M. Zirngibl et al., "An 18–Channel Multifrequency Laser", IEEE Photonics Technology Letters, vol. 8, No. 7, Jul. 1996, pp. 870–872.
Y. Emori et al., "Broadband lossless DCF using Raman amplification pumped by multichannel WDM laser diodes", Electronic Letters, vol. 34, No. 22, Oct. 29, 1998, pp. 2145–2146.

(Continued)

*Primary Examiner*—Minsun Oh Harvey
*Assistant Examiner*—Dung (Michael) T. Nguyen
(74) *Attorney, Agent, or Firm*—Erwin W. Pfeifle; Irwin Ostroff

(57) ABSTRACT

An optical system has a transmission filter device, a feedback mechanism, and one or more radiation sources. Each radiation source generates an output signal with a predetermined wavelength band and polarization and is coupled to a separate input port of the transmission filter device. The transmission filter device, which is responsive to output signal from each radiation source, generates an output signal from at least one output port thereof. The feedback mechanism is coupled to at least one output port of the transmission filter device for providing a feedback signal that is directed back through the transmission filter device to each of the radiation sources for stabilizing each of the radiation sources. The apparatus is polarization maintaining wherein the one or more radiation sources, the transmission filter device, and the feedback mechanism are interconnected such that principle axes of polarization thereof are substantially aligned.

39 Claims, 14 Drawing Sheets

OTHER PUBLICATIONS

Y. Emori et al., "100nm bandwidth flat–gain Raman amplifiers pumped and gain–equalized by 12–wavelength–channel WDM laser diode unit", Electronic Letters, vol. 35, No. 16, Aug. 5, 1999, pp. 1355–1356.

Victor Grubsky et al., "Wavelength–selective coupler and add–drop multiplexer using long–period fiber gratings", OFC 2000, vol. 4, Mar. 10, 2000, pp. 28–30.

Martin Achtenhagen et al., "L–I Charateristics of Fiber Bragg Grating Stabilized 980–nm Pump Lasers", IEEE Photonics Technology Letters, vol. 13, No. 5, May 2001, pp. 415–417.

Beth A. Koelbl et al., Eye Safety Concerns For Ultra Long Haul Networks, National Fiber Optic Engineers Conference, 2001 Technical Proceedings, pp. 856–867.

* cited by examiner

FEEDBACK MECHANISMS FOR STABILIZING A LASER SYSTEM

FIELD OF THE INVENTION

The present invention relates to feedback mechanisms for setting and stabilizing the lasing wavelength and power, and the spectral width of lasers such as semiconductor lasers in laser systems.

BACKGROUND OF THE INVENTION

Lasers (light amplification by stimulated emission of radiation) require incident photons for stimulated emission and amplification. In a Fabry-Perot (FP) laser partial front and back facet mirrors result in multiple passes through the laser cavity of photons and thus amplification of these photons. However, the gain profile of an FP laser is rather broad (15–20 nm) and is highly sensitive to temperature due to energy band gap and refractive index changes. The magnitude of temperature sensitivity on gain profile center wavelength ranges from 0.5 to 0.6 nm/° C. depending on laser design.

The spectral-width and wavelength and output power of laser emission can be controlled and stabilized by providing feedback to the laser cavity. The feedback photons excite a feedback mode with a lower threshold gain than the FP mode if the feedback mode is still within the laser gain profile. By lasing prior to the FP modes, only the modes which correspond to the feedback wavelength and bandwidth are populated. This provides spectral width selection and control. If the wavelength and number of feedback photons are stable against environmental (e.g., temperature) changes, the laser center wavelength temperature, spectral width, and output power sensitivity is reduced.

State of the art optical telecommunication systems require the use of multiple stable lasers for both signal transmitters and optical amplifiers. In the case of signal transmitters, a system of lasers of differing wavelengths and/or polarizations are typically multiplexed together to increase the information carrying capacity of an optical transmission fiber. In the case of optical amplifiers, a system of lasers of differing wavelengths and/or polarizations are typically multiplexed together to provide a high-power depolarized pump source which is then used to pump an optical fiber and induce gain in the optical signals being transmitted through the fiber. As is well known in the art, reflective fiber Bragg gratings are commonly used to stabilize lasers.

Referring now to FIG. 1, there is shown a block diagram of an exemplary prior art multi-laser system 10 which provides feedback to each of a plurality of n lasers (LASER 1, 2, . . . N) 12a–12n using a Distributed Bragg Grating outside the lasers 12a–12n. The system 10 comprises the lasers 12a–12n, a plurality of n optical delays 14a–14n, a plurality of n Fiber Bragg Gratings (FBG 1, 2, . . . N)) 16a–16n, a wavelength division multiplexer (WDM) 18, an optical tap 20, and an optical power detector 22. The n lasers 12a–12n each have an output coupled to a separate input of each of the optical delays 14a–14n, respectively. An output of each of the optical delays 14a–14n is coupled to a separate input of each of the Fiber Bragg Gratings 16a–16n, respectively, and an output from each of the Fiber Bragg Gratings 16a–16n is coupled to a separate input of the WDM 18. The output from the WDM 18 is coupled to an input of the optical tap 20. The optical tap 20 has a first output coupled to the optical power detector 22 and has a second output which serves as an output of the system 10.

In operation, the laser 12a transmits an optical signal at a predetermined wavelength to the optical delay 14a which delays the output signal from the laser 12a by a predetermined amount. The output signal from optical delay 14a is received by the FBG 16a which filters the delayed input signal from the laser 12a and provides a predetermined bandwidth signal to a separate input of the WDM 18. The FBG 16a also reflects a portion of the delayed input signal from the laser 12a back towards laser 12a via the optical delay 14a such that a predetermined signal with a predetermined bandwidth is fed back to stabilize laser 12a. Each of the other lasers 12b–12n and their associated optical delays 14b–14n and FBGs 16a–16n operate in the same manner as described above for laser 12a. The WDM 18 multiplexes the n signals from the FBGs 16a–16n and generates a multiplexed output signal to the optical tap 20. The portion of the multiplexed signal directed to the optical power detector 22 is optionally available for use to control the lasers 12a–12n.

Currently, laser feedback for power and wavelength stabilization is achieved through reflective feedback gratings (a) as an integral part of the laser in Distributed Feedback Lasers (DFB), or Distributed Bragg Reflector Lasers (DBR), or (b) as a discrete component (generally a Fiber Bragg Grating) generally placed outside the laser's coherence length. The problem with typical prior art systems is the use of Fiber Bragg Gratings (FBGs) external to a laser cavity for both the filtering and reflecting feedback mechanism. Such a configuration use limits the methods that can be used for stabilizing lasers. The use of FBGs for filtering and feedback produces overall losses related to the feedback and can cause system instability related to differential drifts in the multiplexing function compared to the filtering or reflection function.

It is desirable to provide feedback mechanisms for stabilizing the lasing wavelength and controlling the spectral width of lasers, such as semiconductor lasers, and optical radiation sources in a laser system which provides for more flexibility in usable components and optical radiation sources, optical feedback with reduced overall loss, and improved production yield potential.

SUMMARY OF THE INVENTION

From a first apparatus aspect, the present invention is an apparatus comprising at least one radiation source, a transmission filter means, and a feedback mechanism. Each radiation source selectively generates an output signal at a predetermined wavelength band and polarization. The transmission filter means comprises a separate input port coupled to each one of the at least one radiation source, and at least one output port for generating a filtered output signal from the output signal generated by the at least one radiation source. The feedback mechanism is coupled to at least one of the at least one output port of the transmission filter means for providing a feedback signal that is directed back through the transmission filter means for stabilizing each of the at least one radiation source. The apparatus is arranged to be polarization maintaining wherein the at least one radiation source, the transmission filter means, and the feedback mechanism are interconnected such that principle axes of polarization thereof are substantially aligned.

From a second apparatus aspect, the present invention is an apparatus comprising at least a first and a second radiation source, a transmission filter/multiplexer, and a feedback mechanism. Each radiation source selectively generates an output signal from one of a group consisting of a separate wavelength band, a same wavelength band and a different polarization from that of another radiation source, and a different wavelength band and a different polarization from that of another radiation source. The transmission filter/multiplexer comprises at least one output port, and a separate input port coupled to each one of the at least first and second radiation sources for multiplexing and filtering the received output signals from the at least first and second radiation sources and generating a multiplexed output signal therefrom at the at least one output port. The feedback mechanism is coupled to at least one of the at least one output port of the transmission filter/multiplexer for generating a feedback signal that is directed back through the transmission filter/multiplexer for stabilizing the at least first and second radiation sources. The apparatus is arranged to be polarization maintaining wherein the at least first and second radiation sources, the transmission filter/multiplexer, and the feedback mechanism are interconnected such that principle axes of polarization thereof are substantially aligned.

The invention will be better understood from the following more detailed description taken with the accompanying drawings and claims.

Figure 1:
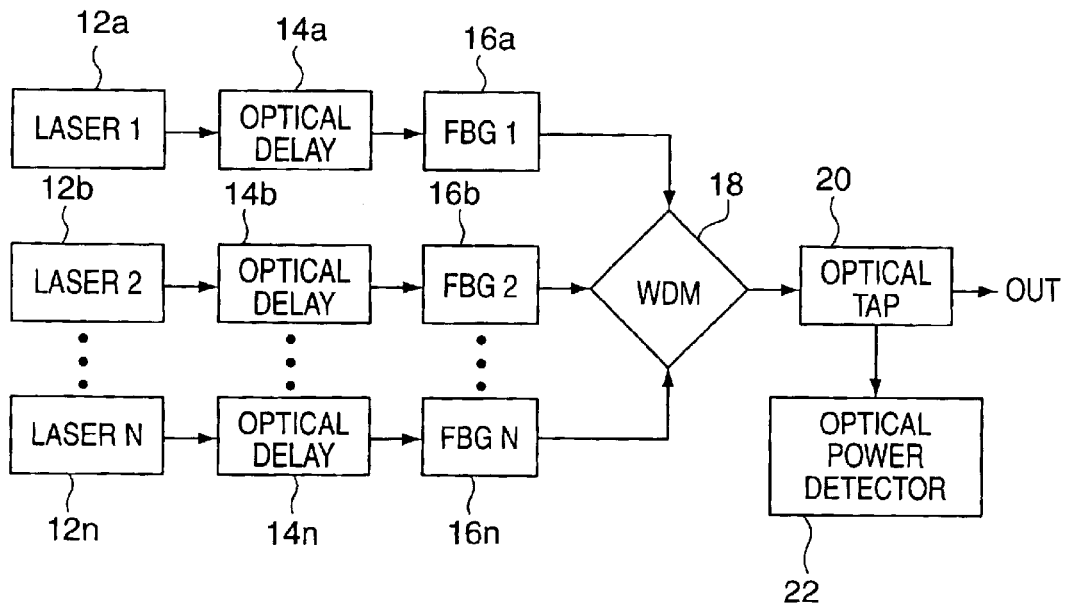
FIG. 1 is a block diagram of an exemplary prior art multi-laser system which provides feedback to lasers used therein.

The drawings are not necessarily to scale.

DETAILED DESCRIPTION OF THE INVENTION

Referring now to FIGS. 2, 3, 4, 5, 6, 7, and 8, there are shown block diagrams of laser systems 30, 3000, 4000, 40, 50, 60, and 230, respectively, which show the concept of including a single respective reflective feedback mechanism 38, 3800, 4800, 48, 58, 68, and 238 located in a fundamental output of one of a group consisting of a transmission filter 34, an optical combiner 3500, and combination transmission filter/multiplexers 4500, 44, 54, 64, and 234, respectively, in accordance with a first embodiment of the present invention.

A fundamental output is defined to be either a primary or zeroth-order output port. A primary output is defined to be the maximum power output port of a transmission filter 34, optical combiner 3500 or a combination transmission filter/multiplexer 4500, 44, 64 which operates based on the interference of light. A zeroth-order output is defined to be the maximum power output port of a transmission filter 34 or a combination transmission filter/multiplexer 4500, 54, 234 which operates based on the diffraction and interference of light.

To achieve stable laser operation, the entire apparatus comprising each of the laser systems 30, 3000, 4000, 40, 50, 60, and 230 is polarization maintaining in that each of the components comprising each apparatus is polarization maintaining in that each of these components can be described from an optical polarization perspective by the identification within each component of two principle axes of polarization which are not equal with respect to effective refractive index and/or optical propagation loss. Furthermore, these components are all relatively orientated and fixed in place such that their principle axes are nominally aligned.

In the laser systems 30, 3000, 4000, 40, 50, 60, and 230, optional time delays 36, 3600, 4600, 46, 56, 66, and 236, when included, introduce a predetermined delay in the optical signal passing there through in either direction. These optional time delays introduce a predetermined time delay into the feedback signal for transmission as a predetermined incoherent or partially-coherent signal back through the respective one of a group consisting of a transmission filter 34, an optical combiner 3500, and combination transmission filter/multiplexer 4500, 44, 54, 64, and 234 when such incoherent signal is required to stabilize the respective optical radiation sources 32, 3200a–3200n, 4200a–4200n, 42a and 42b, 52a–52d, 62a and 62b, and 232a–232d. Without the respective time delays included in the respective systems, a coherent feedback signal is provided to stabilize the respective optical radiation sources. These optional time delays can comprise any suitable time delay such as an optical path length.

In the laser systems 30, 3000, 4000, 40, 50, 60, and 230, the respective reflectors 38, 3800, 4800, 48, 58, 68, and 238 can comprise any suitable mirror such as a loop mirror, dielectric mirror, metal mirror, refractive index discontinuity, or other suitable reflector device. These reflectors are all optionally tunable so that the laser system properties which are influenced by feedback (e.g., wavelength, output optical power and stability over time, and environmental conditions) can be optimized.

When the laser systems 3000 (FIG. 3), 4000 (FIG. 4), and 50 (FIG. 6) operate with high power, a respective optional power tap 3900, 4900, and 59 coupled to a respective optical power monitor 3700, 4700, and 57 can be included in the system fundamental output which can be used to monitor backward propagating optical power which results from open optical circuits (e.g., fiber breaks, non-terminated fiber optic connectors) in the respective systems, and to shut down the respective lasers 3200a–3200n, 4200a–4200n, and 52a–52d should such breaks occur.

When the laser systems 3000, 4000, 40, 50, 60, and 230, are intended to be used for amplification in general, a depolarized S optical output may be desired in order to minimize the polarization dependence of such amplifiers. This can be effectively achieved in the following multi-laser systems when used in practical fiber-optic telecommunications systems by using an even number of respective optical radiation sources 3200a–3200n, 4200a–4200n, 42a and 42b, 52a–52d, 62a and 62b, and 232a–232d and configuring them such that they are grouped in pairs which are orthogonally polarized and whose wavelengths differ by an amount of up to 60 nm, the smaller the wavelength separation in general resulting in reduced amplifier polarization sensitivity. The output of such a laser system is said to be substantially depolarized or equivalently to possess a low degree of polarization (DOP).

Figure 2:
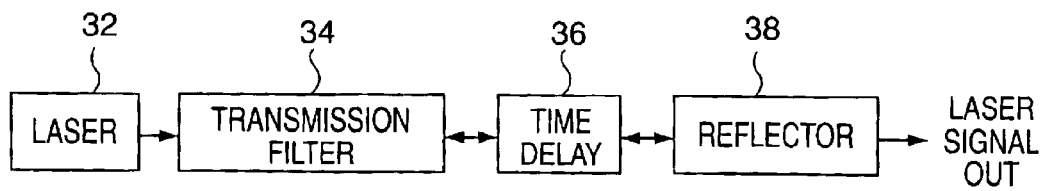
FIG. 2 is a block diagram of a single laser system including a feedback mechanism in a fundamental output of a transmission filter in accordance with a first embodiment of the present invention.

Referring now to FIG. 2, there is shown a block diagram of a single laser system 30 comprising a single feedback mechanism in a fundamental output of an optical transmission filter 34 that provides a stabilizing optical feedback in a predetermined polarization state and within a predetermined wavelength band to an optical radiation source (LASER) 32 in accordance with the first embodiment of the present invention.

The laser system 30 comprises the optical radiation source 32, the transmission filter 34, an optional time delay 36, and a reflector 38 serially connected together such that polarization is substantially maintained across each connection point. The output of the optical radiation source 32 is substantially polarized in a single linear polarization and this polarization is substantially aligned to one of the principle polarization axes of the transmission filter 34.

The optical radiation source 32 may be a semiconductor laser with a high reflectance coating on the back facet and a low reflectance coating on the front facet, the front facet being taken as the optical radiation source 32 output. Due to this configuration, stimulated emission from the optical radiation source 32 is relatively small and as a result the optical radiation source 32 selectively generates an output light signal over a relatively wide predetermined wavelength range that is transmitted to an input of the transmission filter 34. The transmission filter 34 is designed to pass a predetermined wavelength band that falls within the predetermined wavelength range of the optical radiation source 32 to its output and, in turn, to the optional time delay 36 and then to the reflector 38. The reflector 38 is arranged to pass a predetermined major first portion of the optionally delayed optical signal from the transmission filter 34 as an optical output signal from the laser system 30, and reflect a predetermined remaining second portion of the optionally delayed optical signal back towards the optional time delay 36 as a feedback signal of predetermined polarization and wavelength. The reflector 38 input and reflected optical signals are substantially the same in optical properties as in, for example, polarization and wavelength. The feedback signal then passes again through the optional time delay 36 and transmission filter 34 before entering the optical radiation source 32 output. The feedback signal propagates through the laser 32 from the output (low reflectance) endface to the high reflectance endface and is substantially reflected from the high reflectance endface back to the output (low reflectance) endface of the laser 32. This process results in substantial stimulated emission and hence gain in the power of the particular wavelengths comprising the feedback. Only feedback in the same polarization as the initial optical radiation source 32 output will experience significant gain. This process of feedback and amplification continues until a steady state optical radiation source 32 output is achieved, the properties of which are substantially determined by the transmission filter 34, optional time delay 36, reflector 38, and the resonant system which is formed between the high reflectance endface of the optical radiation source 32 and the reflector 38. The resultant feedback substantially determines the output properties (e.g., wavelength, output optical power and stability over time, and environmental conditions) of the optical radiation source 32.

The transmission filter 34 can comprise any suitable filter as, for example, a grating assisted coupler, a Long Period Grating (LPG), an Array Waveguide Grating (AWG), an asymmetric Mach Zehnder interferometer or multiplexer, a Diffraction Grating or dielectric mirror.

A fundamental difference, and an advantage, in the laser system 30 over that of the conventional Fiber Bragg Grating (FBG) approach shown in FIG. 1 is the ability to decouple the filtering function of the transmission filter 34 from the function of the reflector 38. This permits the use of many filter architectures and additional design freedoms in component placement and design.

Figure 3:
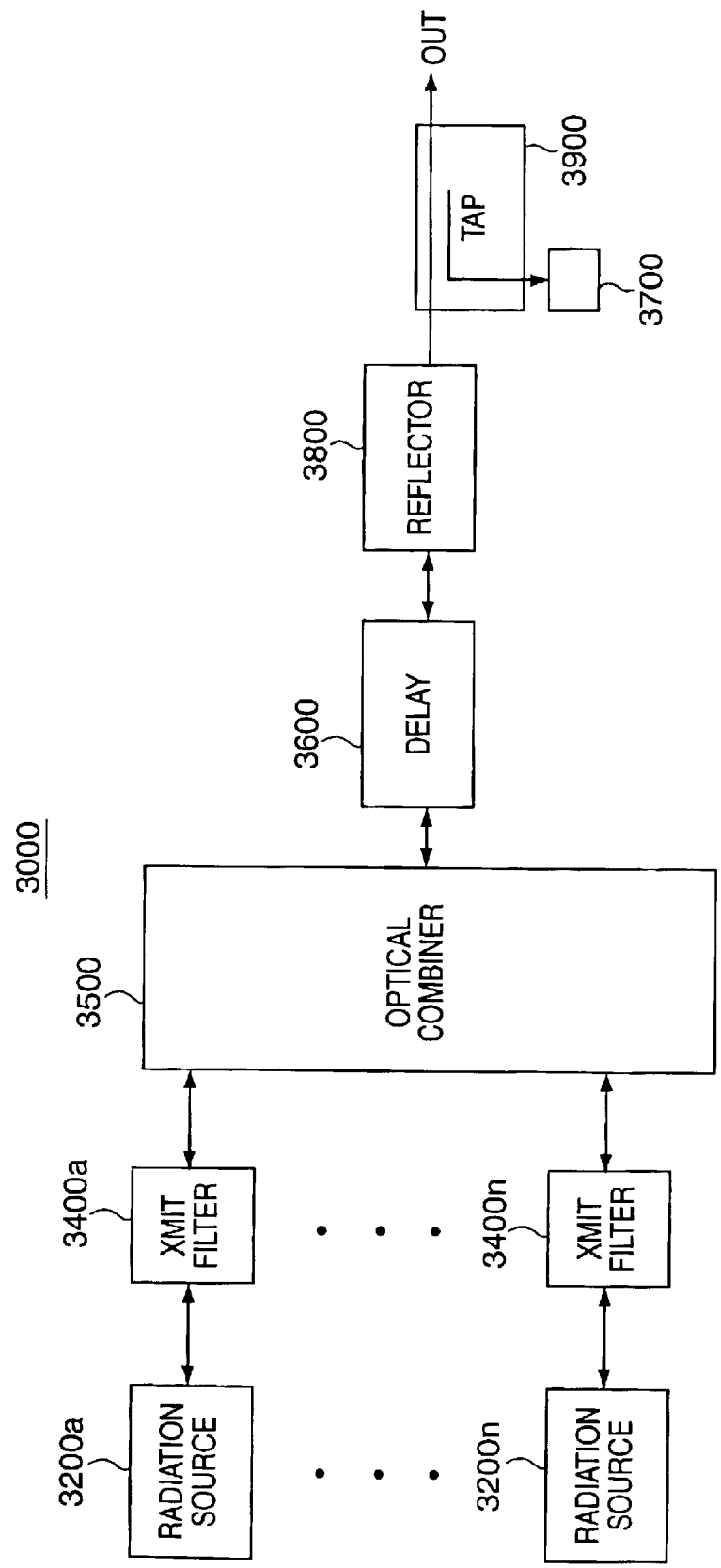
FIG. 3 is a block diagram of a multi-laser system comprising a single feedback mechanism in a fundamental output of an optical combiner which provides stabilizing optical feedback in one of two polarization states and predetermined wavelength bands to a plurality of optical radiation sources in accordance with the first embodiment of the present invention.

Referring now to FIG. 3, there is shown a block diagram of a multi-laser system 3000 comprising a single feedback mechanism in a primary output of an optical combiner 3500 that provides stabilizing optical feedback in one of two polarization states, and within a respective plurality of predetermined wavelength bands, to a respective plurality of optical radiation sources 3200a–3200n in accordance with the first embodiment of the present invention.

The laser system 3000 comprises the plurality of optical radiation sources 3200a–3200n that generate varying wavelengths and/or polarizations, a plurality of respective transmission filters 3400a–3400n, the optical combiner 3500, and an optional time delay 3600 and a reflector 3800, which forms the feedback mechanism, serially connected together such that polarization is substantially maintained across each connection point. The output of each of the plurality of optical radiation sources 3200a–3200n is substantially polarized in a respective linear polarization, which polarizations are substantially aligned to one of the principle polarization axes of the respective plurality of transmission filters 3400a–3400n. No more than two of the transmission filters 3400a–3400n may have substantially the same predetermined wavelength band. If two of the transmission filters 3400a–3400n have substantially the same predetermined wavelength band, then the polarizations of the two respective optical radiation sources 3200a–3200n must be substantially aligned to orthogonal principle polarization axes of the two respective transmission filters 3400a–3400n. An optional optical tap 3900 is coupled in the output of the laser system 3000 and to an optional monitor 3700. The monitor 3700 can be used to monitor back-reflections for detecting fiber breaks in the respective system 3000 and to shut down the respective radiation sources 3200a–3200d should such breaks occur.

The transmission filters 3400a . . . 3400n and optical combiner 3500 act essentially as a transmission filter/multiplexer.

The optical radiation sources 3200a–3200n may be semiconductor lasers with each having a high reflectance coating on the back facet and a low reflectance coating on the front facet, the front facet being taken as the optical radiation source output of the radiation sources 3200a–3200n. Due to this configuration, the respective stimulated emissions from each of the plurality of optical radiation sources 3200a–3200n are relatively small and as a result each of the optical radiation sources 3200a–3200n selectively generate a respective output light signal over a relatively wide respective predetermined wavelength range that is transmitted to the respective inputs of the plurality of transmission filters 3400a–3400n. Each of the plurality of transmission filters 3400a–3400n are designed to pass a respective predetermined wavelength band that falls within the predetermined wavelength range of the respective optical radiation sources 3200a–3200n to its output, and then to the optical combiner 3500 where the outputs of the plurality of transmission filter 3400a–3400n are combined and, in turn, pass this combined signal to the optional time delay 3600 and then to the reflector 3800. The reflector 3800 is arranged to pass a predetermined major first portion of the optionally delayed combined optical signal from the optical combiner as a composite optical output signal from the laser system 3000, and reflect a predetermined remaining second portion of the optionally delayed combined optical signal back towards the time delay 3600 as a respective feedback signal of predetermined polarizations and wavelengths. The reflector 3800 input and reflected combined optical signals are substantially the same in optical properties as in for example polarization and wavelength. The combined feedback signal then passes again through the optional time delay 3600 and into the optical combiner 3500 where the combined signal is divided in power and/or polarization and directed to the plurality of transmission filters 3400a–3400n. Each of the plurality of transmission filters 3400 passes only a predetermined band of wavelengths from the incident combined signal to the respective outputs of the plurality of optical radiation sources 3200a–3200n. Each of the plurality of respective feedback signals propagate through the respective one of the plurality of lasers 3200a–3200n from the output (low reflectance) endface to the high reflectance endface and is substantially reflected from the high reflectance endface back to the output (low reflectance) endface of the respective one of the lasers 3200a–3200n, in the process resulting in substantial stimulated emission and hence gain in the power of the particular wavelengths comprising the respective feedback. Only feedback in the same polarization as the output of the initial respective one of the optical radiation sources 3200a–3200n will experience significant gain. This process of feedback and amplification continues until a steady state output is achieved for the plurality of optical radiation sources 3200a–3200n, the properties of each of which are substantially determined by the respective plurality of transmission filters 3400a–3400n, the optional time delay 3600, the reflector 3800, and the respective resonant systems which are formed between the respective high reflectance endfaces of the plurality of optical radiation sources 3200a–3200n and the reflector 3800. The resultant respective feedback substantially determines the output properties (e.g., wavelength and output optical power) of the plurality of respective optical radiation sources 3200a–3200n.

The plurality of transmission filters 3400a–3400n can comprise any suitable filter as, for example, a Long Period Grating (LPG), a Array Waveguide Grating (AWG), an asymmetric Mach Zehnder interferometer or multiplexer, a Diffraction Grating or dielectric mirror. The optical combiner 3500 can comprise any suitable means of combining optical signals such as a directional coupler or a concatenation of directional couplers.

A fundamental difference and an advantage in the laser system 3000 over that of the conventional Fiber Bragg Grating (FBG) approach shown in FIG. 1 is the ability to decouple the filtering function of the plurality of transmission filters 3400a–3400n from the function of the reflector 3800 which permits the use of many filter architectures and additional design freedoms in component placement and design as is shown hereinafter in the below described embodiments.

Figure 4:
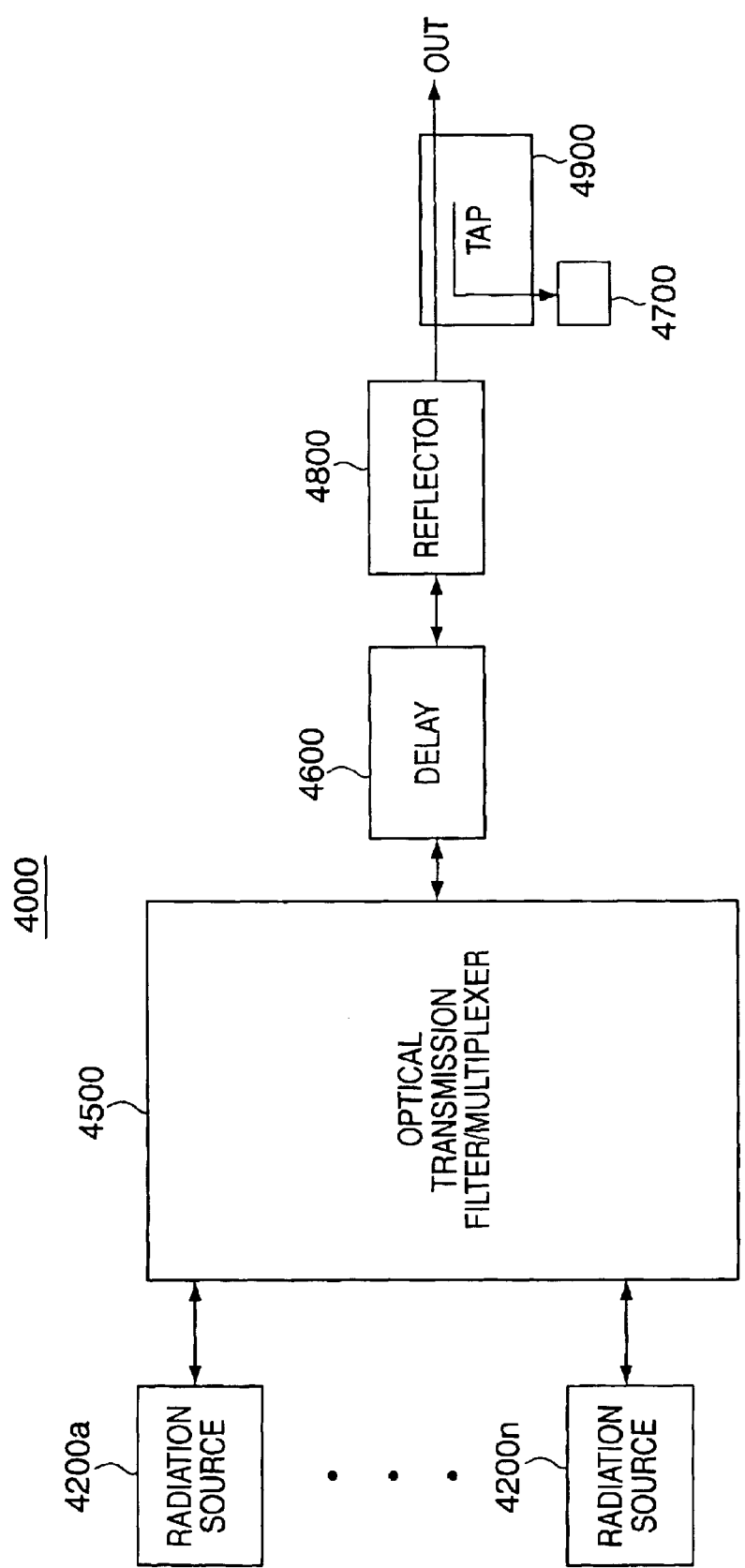
FIG. 4 is a block diagram of a multi-laser system comprising a single feedback mechanism in a fundamental output of an optical transmission filter/multiplexer that provides stabilizing optical feedback in one of two polarization states and predetermined wavelength bands to a respective plurality of optical radiation sources in accordance with the first embodiment of the present invention.

Referring now to FIG. 4, there is shown a block diagram of a multi-laser system 4000 comprising a single feedback mechanism in a fundamental output of an optical transmission filter/multiplexer 4500 that provides stabilizing optical feedback in one of two polarization states and within a respective plurality of predetermined wavelength bands to a respective plurality of optical radiation sources 4200a–4200n in accordance with the first embodiment of the present invention.

The laser system 4000 comprises the plurality of optical radiation sources 4200a–4200n generating varying wavelengths and/or polarizations, the optical transmission filter/multiplexer 4500 that performs multiplexing and demultiplexing in the optical wavelength and/or polarization domains comprising a plurality of inputs and one fundamental output, an optional time delay 4600, and a reflector 4800 serially connected together such that polarization is substantially maintained across each connection point. The output of each of the plurality of the optical radiation sources 4200a–4200n is coupled to a separate input of optical transmission filter/multiplexer 4500 and is substantially polarized in a respective linear polarization and these polarizations are substantially aligned to one of the principle polarization axes of the respective plurality of transmission filter/multiplexer 4500 inputs. A fundamental input/output of the optical transmission filter/multiplexer 4500 is coupled to an input/output of the optional time delay 4600. Another output/input of the optional time delay 4600 is coupled to an input/output of the reflector 4800. An optional optical tap 4900 is coupled to an output of the reflector 4800 that is an output of the laser system 4000 and to an optional monitor 4700. The monitor 4700 can be used to monitor back-reflections for detecting fiber breaks in the respective system 4000 and to shut down the respective radiation sources 4200a–4200d should such break occur. No more than two of the transmission filter/multiplexer 4500 inputs may have substantially the same predetermined wavelength band. If two transmission filter/multiplexer 4500 inputs have substantially the same predetermined wavelength band then the polarizations of two of the respective optical radiation sources 4200a–4200n must be substantially aligned to orthogonal principle polarization axes of the respective transmission filter/multiplexer 4500 inputs.

The optical radiation sources 4200a–4200n may be semiconductor lasers with a high reflectance coating on the back facet and a low reflectance coating on the front facet, the front facet being taken as the optical radiation source 4200 output. Due to this configuration, the respective stimulated emissions from each of the plurality of optical radiation sources 4200a–4200n are relatively small and as a result each of the optical radiation sources 4200a–4200n selectively generate a respective output light signal over a relatively wide respective predetermined wavelength range that is transmitted to the respective inputs of the plurality of transmission filter/multiplexer 4500 inputs. Each of the plurality of transmission filter/multiplexer 4500 inputs are designed to pass a respective predetermined wavelength band that falls within the predetermined wavelength range of the respective optical radiation sources 4200a–4200n to the output of the optical transmission filter/multiplexer 4500, while simultaneously multiplexing these inputs in the optical wavelength and/or polarization domains, and transmitting this filtered, composite signal to the transmission filter/multiplexer 4500 fundamental output, in turn, passing this combined signal to the optional time delay 4600 and then to the reflector 4800. The reflector 4800 is arranged to pass a predetermined major first portion of the optionally delayed composite optical signal from the transmission filter/multiplexer 4500 as a composite optical output signal from the laser system 4000, and to reflect a predetermined remaining second portion of the optionally delayed composite optical signal back towards the time delay 4600 as a respective feedback signal of predetermined polarizations and wavelengths. The reflector 4800 input and reflected composite optical signals are substantially the same in optical properties as in for example polarization and wavelength. The composite feedback signal then passes again through the optional time delay 4600 and into the optical transmission filter/multiplexer 4500 where the composite signal is separated by respective wavelength and/or polarization and directed to the respective plurality of transmission filter/multiplexer 4500 inputs. Each of the plurality of transmission filter/multiplexer 4500 inputs passes only a predetermined band of wavelengths and/or polarization from the incident composite demultiplexed signal to the respective outputs of the plurality of optical radiation sources 4200a–4200n. Each of the plurality of respective feedback signals propagate through the respective one of the lasers 4200a–4200n from the output (low reflectance) endface to the high reflectance endface and is substantially reflected from the high reflectance endface back to the output (low reflectance) endface of the respective one of the lasers 4200a–4200n, in the process resulting in substantial stimulated emission and hence gain in the power of the particular wavelengths comprising the respective feedback. Only feedback in the same polarization as the output of the initial respective one of the optical radiation sources 4200a–4200n will experience significant gain. This process of feedback and amplification continues until a steady state output is achieved for the plurality of optical radiation sources 4200a–4200n, the properties of each of which are substantially determined by the respective plurality of transmission filter/multiplexer 4500 inputs, the optional time delay 4600, the reflector 4800, and the respective resonant systems which are formed between the respective high reflectance endfaces of the plurality of optical radiation sources 4200a–4200n and the reflector 4800. The resultant respective feedback substantially determines the output properties (e.g., wavelength and output optical power) of the plurality of respective optical radiation sources 4200a–4200n.

The transmission filter/multiplexer 4500 can comprise any suitable transmission filter/multiplexer of finite free spectral range which is capable of multiplexing in the wavelength and/or polarization domains as, for example, a Long Period Grating (LPG), a Grating Assisted Coupler, an Array Waveguide Grating (AWG), an asymmetric Mach Zehnder interferometer, a Ring Resonator, a Diffraction Grating, dielectric mirror, or cascade of dielectric mirrors. In all cases, the free spectral range of the transmission filter/multiplexer 4500 is chosen to be wider than a substantial majority of the predetermined wavelength range output of the unstabilized optical radiation sources 4200a–4200n so that only a single wavelength band is output from each of the optical radiation sources 4200a–4200n. If this condition were not met, it would be possible for a single stabilized one of the optical radiation sources 4200a–4200n to output multiple predetermined wavelength bands some of which may overlap with the predetermined wavelength bands of other stabilized optical radiation sources 4200a–4200n, resulting in the sharing of feedback signals. This sharing of feedback signals between optical radiation sources 4200a–4200n may result in unstable operation as the amount of feedback to a particular one of the optical radiation sources 4200a–4200n will increase and decrease as the output powers of other stabilized optical radiation sources 4200a–4200n are adjusted. The sharing of feedback by optical radiation sources 4200a–4200n will also result in their stabilized outputs becoming correlated which will tend to decrease the depolarization of the laser system 4000 output.

A first fundamental difference and an advantage in the laser system 4000 over that of the conventional Fiber Bragg Grating (FBG) approach shown in FIG. 1 is that since the transmission filter/multiplexer functions are occurring simultaneously and are a part of the respective resonant structures that substantially determine the laser system 4000 output, the system is effectively "self-aligning" with respect to wavelength and polarization as opposed to the laser system 10 of FIG. 1 where the wavelengths of the lasers 12a–12n are determined by the fiber gratings 16a–16n, these individual outputs then being combined in the WDM 18. In the case of the laser system 10, should the WDM wavelength passbands change relative to the wavelength outputs from the fiber gratings 16a–16n, as is usually the case with environmental conditions (e.g., temperature, pressure, humidity and mechanical stress for example) and over time, the output power of the laser system 10 will be reduced due to this wavelength misalignment. In the case of the laser system 4000, the transmission filter/multiplexer 4500 simultaneously defines the output passband wavelengths of the laser system 4000 and the output passband wavelengths of stabilized radiation sources 4200a–4200n, and simultaneously multiplexes these wavelengths before outputting them from the laser system 4000 after passage through the optional delay 4600 and the reflector 4800. Over environmental conditions (e.g. temperature, pressure, humidity and mechanical stress for example) and over time the output power of the laser system 4000 will not be reduced due to wavelength misalignment since it is substantially eliminated.

A second fundamental difference and an advantage in the laser system 4000 over that of the conventional Fiber Bragg Grating (FBG) approach shown in FIG. 1 is the ability to decouple the filtering function found at the plurality of transmission filter/multiplexer 4500 inputs from the function of the reflector 4800 which permits the use of many filter architectures and additional design freedoms in component placement and design as is shown hereinafter in the below described embodiments.

Figure 5:
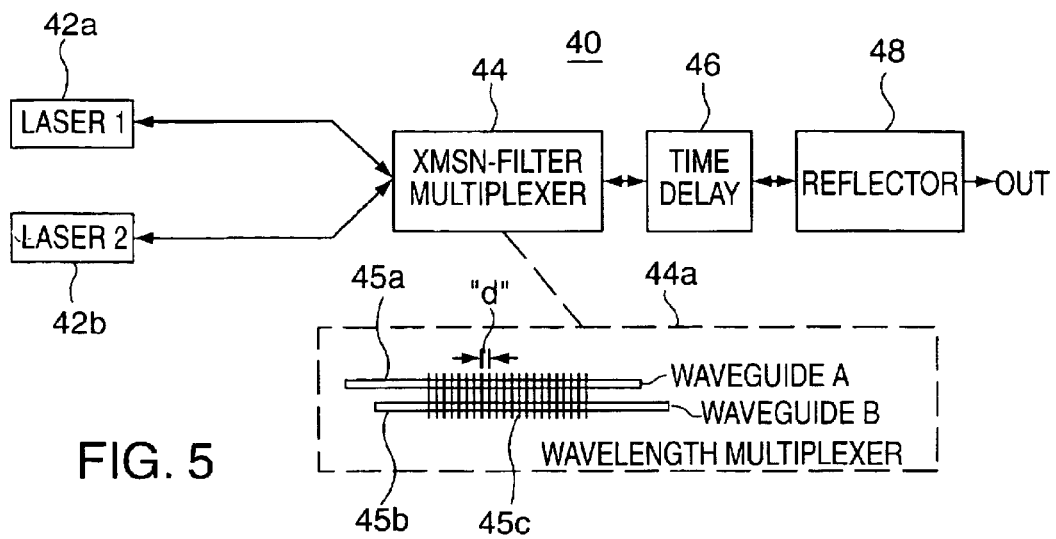
FIG. 5 is a block diagram of a multi-laser system including a feedback mechanism in a fundamental output of a transmission filter/multiplexer in accordance with the concept of the first embodiment of the present invention.

Referring now to FIG. 5, there is shown a specific exemplary implementation of the laser system 4000 of FIG. 4, namely a block diagram of a multi-laser system 40 comprising a single feedback mechanism 46, 48 in a primary output of an optical transmission filter/multiplexer (XMSN FILTER MULTIPLEXER) 44 that provides stabilizing optical feedback in one of two predetermined polarization states and within a respective one of two predetermined wavelength bands to a respective one of two optical radiation sources (LASER 1, LASER 2) 42a and 42b in accordance with the first embodiment of the present invention.

The laser system 40 comprises the two optical radiation sources 42a and 42b of wavelengths and polarizations in one of three arrangements, an optical transmission filter/multiplexer 44 with two inputs and one primary output which performs multiplexing and demultiplexing in the optical wavelength and/or polarization domains, an optional time delay 46, and a reflector 48 serially connected together such that polarization is substantially maintained across each connection point. The output of each of the optical radiation sources 42a and 42b is substantially polarized in a respective linear polarization and these polarizations are substantially aligned to one of the principle polarization axes of the two respective inputs of the transmission filter/multiplexer 44.

In a first arrangement, the optical radiation sources 42a and 42b have their polarizations aligned to the same principle polarization axes of the two respective transmission filter/multiplexer 44 inputs while the two transmission filter/multiplexer 44 inputs transmit different predetermined optical wavelength bands to the transmission filter/multiplexer 44 primary output. In a second arrangement, the optical radiation sources 42a and 42b have their polarizations substantially aligned to the two different principle polarization axes of the two respective transmission filter/multiplexer 44 inputs while the two transmission filter/multiplexer 44 inputs transmit substantially the same predetermined optical wavelength bands to the transmission filter/multiplexer 44 primary output. In a third arrangement, the optical radiation sources 42a and 42b have their polarizations substantially aligned to the two different principle polarization axes of the two respective transmission filter/multiplexer inputs while the two transmission filter/multiplexer inputs transmit substantially different predetermined optical wavelength bands to the transmission filter/multiplexer primary output.

The optical radiation sources 42a and 42b behave substantially the same as the radiation sources 4200a and 4200b of the laser system 4000. Each of the two transmission filter/multiplexer 44 inputs are designed to pass a respective predetermined wavelength band that falls within the predetermined wavelength range of the respective optical radiation sources 42a and 42b to the output of the optical transmission filter/multiplexer 44. Simultaneously, the transmission filter/multiplexer 44 multiplexes these input signals in the optical wavelength domain in the case of the first arrangement, in the optical polarization domain in the case of the second arrangement, or simultaneously in the optical wavelength and polarization domains as in the third arrangement, and transmits this filtered and composite signal to the transmission filter/multiplexer 44 primary output and, in turn, to the optional time delay 46 and then to the reflector 48. The reflector 48 is arranged to pass a predetermined major first portion of the optionally delayed composite optical signal from the transmission filter/multiplexer 44 as a composite optical output signal from the laser system 40, and to reflect a predetermined remaining second portion of the optionally delayed composite optical signal back towards the optional time delay 46 as a respective feedback signal of predetermined polarizations and wavelengths. The reflector 48 input and reflected composite optical signals are substantially the same in optical properties as in, for example, polarization and wavelength. The composite feedback signal then passes again through the optional time delay 46 and into the optical transmission filter/multiplexer 44 where the composite signal is separated by respective wavelength and/or polarization and directed to the respective two transmission filter/multiplexer 44 inputs. Each of the two inputs of the transmission filter/multiplexer 44 passes only a predetermined-band of wavelengths and/or polarization from the incident composite signal to the respective outputs of the two optical radiation sources 42a and 42b. The process of feedback and amplification continues in a manner substantially the same as that described hereinbefore for the laser system 4000 until a steady state output is achieved for the two optical radiation sources 42a and 42b, the properties of each of which are substantially determined by the two respective transmission filter/multiplexer 44 inputs, the optional time delay 46, the reflector 48, and the two respective resonant systems which are formed between the respective high reflectance endfaces of the two optical radiation sources 42a and 42b and the reflector 48. The resultant respective feedback substantially determines the output properties (e.g., wavelength, output optical power and stability over time and environmental conditions) of the two respective optical radiation sources 42a and 42b.

FIG. 5 also shows, within a dashed line rectangle, an exemplary optical transmission filter/multiplexer 44a known in the art as a Grating Assisted directional Coupler (GAC), which can be multiplexer 44 in the system 40, and comprises a first waveguide (WAVEGUIDE A) 45a, a second waveguide (WAVEGUIDE B) 45b, that is disposed parallel thereto, and gratings 45c having spacings of "d" therebetween for coupling and filtering light between the waveguides 45a and 45b and the grating assisted directional coupler output as is well known in the art. The GAC transmission filter/multiplexer 44a is subject to the same free spectral range requirements as for the transmission filter/multiplexer 4500 of the laser system 4000.

The laser system 40 shares the same fundamental advantages as the laser system 4000 of FIG. 4.

Figure 6:
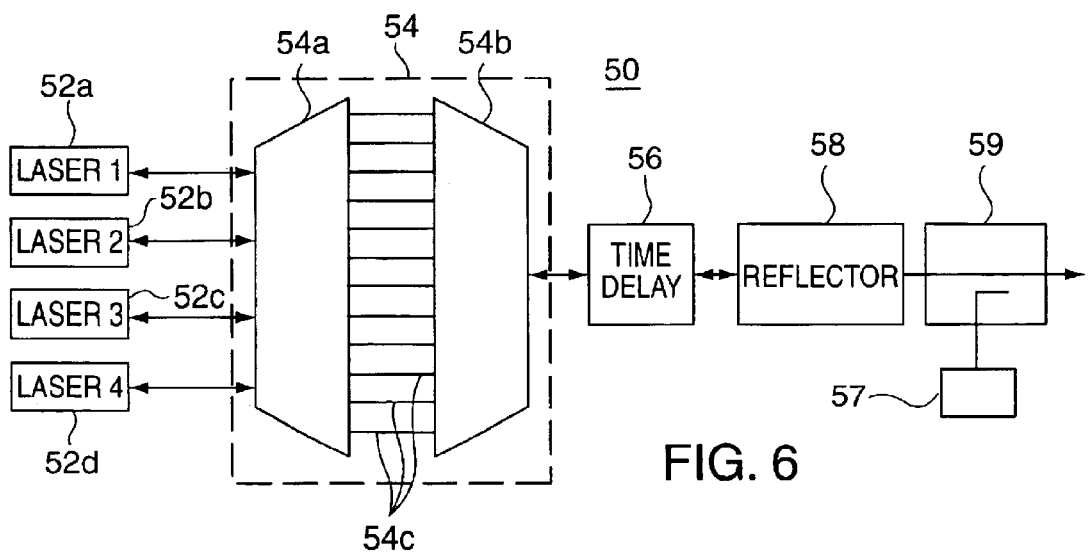
FIG. 6 is a block diagram of an alternative multi-laser system including a feedback mechanism in a fundamental output of an array waveguide multiplexing transmission filter in accordance with the concept of the first embodiment of the present invention.

Referring now to FIG. 6, there is shown a specific exemplary implementation of the laser system 4000 of FIG. 4, namely a block diagram of a multi-laser system 50 comprising a single feedback mechanism 56, 58 in a zeroth-order (m=0) output of an optical transmission filter/multiplexer 54 (shown within a dashed line rectangle) that provides stabilizing optical feedback in one of two predetermined polarization states and within a respective one of four predetermined wavelength bands to a respective one of four optical radiation sources (LASER 1, LASER 2, LASER 3, LASER 4) 52a–52d in accordance with the first embodiment of the present invention. The laser system 50 comprises the four optical radiation sources 52a–52d of various wavelengths and polarizations, an optical transmission filter/multiplexer 54 comprising four input/outputs and one fundamental input/output that performs multiplexing and demultiplexing in the optical wavelength and/or polarization domains, an optional time delay 56, and a reflector 58 serially connected together such that polarization is substantially maintained across each connection point. An optional optical tap 59 is coupled in the output of the laser system 50 and to an optional monitor 57. The monitor 57 can be used to monitor back-reflections for detecting fiber breaks in the respective system 50 and to shut down the respective radiation sources 52a–52d should such break occur. The output of each of the optical radiation sources 52a–52d is substantially polarized in a respective linear polarization and these polarizations are substantially aligned to one of the principle polarization axes of the respective plurality of inputs of the transmission filter/multiplexer 54. In general, the stabilized optical radiation sources 52a–52d have different predetermined wavelengths. No more than two of the stabilized radiation sources 52a–52d may have substantially the same predetermined wavelength band. If two stabilized radiation sources 52a–52d have substantially the same predetermined wavelength band then the polarizations of the respective two optical radiation sources 52a–52d must be substantially aligned to orthogonal principle polarization axes of the inputs of the respective transmission filter/multiplexer 54.

The optical radiation sources 52a–52d behave substantially the same as the radiation sources 42a and 42b of the laser system 40. Each of the four inputs of the transmission filter/multiplexer 54 are designed to pass a respective predetermined wavelength band that falls within the predetermined wavelength range of the respective optical radiation sources 52a–52d to the output of the optical transmission filter/multiplexer 54. Simultaneously, the transmission filter/multiplexer 54 multiplexes the input signals in the optical wavelength and/or polarization domains and transmits this filtered and composite signal to the zeroth-order (m=0) output of the transmission filter/multiplexer 54 and, in turn, passes this combined signal to the optional time delay 56 and then to the reflector 58. The reflector 58 is arranged to pass a predetermined major first portion of the optionally delayed composite optical signal from the transmission filter/multiplexer 54 as a composite optical output signal from the laser system 50, and reflect a predetermined remaining second portion of the optionally delayed composite optical signal back towards the time delay 56 as a respective feedback signal of predetermined polarizations and wavelengths. The reflector 58 input and reflected composite optical signals are substantially the same in optical properties as in, for example, polarization and wavelength. The composite feedback signal then passes again through the optional time delay 56 and into the optical transmission filter/multiplexer 54 where the composite signal is separated by respective wavelength and/or polarization and directed to the respective four transmission filter/multiplexer 54 inputs. Each of the four inputs of the transmission filter/multiplexer 54 passes only a predetermined band of wavelengths and/or polarization from the incident composite signal to the respective outputs of the four optical radiation sources 52a–52d. The process of feedback and amplification continues in a manner substantially the same as that for the laser system 40 until a steady state output is achieved for the four optical radiation sources 52a–52d, the properties of each of which are substantially determined by the four respective transmission filter/multiplexer 54 inputs, the optional time delay 56, the reflector 58, and the four respective resonant systems which are formed between the respective high reflectance endfaces of the four optical radiation sources 52a–52d and the reflector 58. The resultant respective feedback substantially determines the output properties (e.g. wavelength, output optical power and stability over time and environmental conditions) of the four respective optical radiation sources 52a–52d.

FIG. 6 shows an exemplary optical transmission filter/multiplexer 54 known in the art as an Array Waveguide Grating (AWG) (shown within a dashed line rectangle) in the system 50. The AWG functions in essentially the same manner as a bulk diffraction grating which is well known in the art. The AWG multiplexing transmission filter 54 comprises a first Free Propagating Region (FPR) 54a, a second FPR 54b, and a plurality of waveguides 54c interconnecting the first and second FPRs 54a and 54b as is well known in the art. Although not shown, each of the plurality of waveguides 54c comprises a different predetermined optical length as is well known in the art (see, for example, H. Takahashiet et al., "Transmission characteristics of arrayed waveguide N×N waveguide multiplexer" J. of lightwave Technology, Vol. 13, No 3, March 1995, pages 447–455). The predetermined difference in optical lengths of the waveguides 54c imparts respective predetermined relative phase differences to optical signals propagating through the waveguides 54c. The AWG utilizes a combination of these relative phase differences, interference, and diffraction to multiplex or demultiplex optical signals. For multiplexing, the multiple input signals from the lasers 52a–52d are positioned on a waveguide slab forming the first FPR 54a in such a way that after propagating through the waveguide slab 54a, and the array of waveguides 54c with offset optical lengths (not shown), and a second waveguide slab forming the FPR 54b, a zeroth diffraction order (m=0) of all of the multiplexed input signals coincides with the output waveguide of the AWG 54. Whereas most of the power of the multiplexed input signals from the lasers 52a–52d is found in the zeroth diffraction order, some power resides in non-zero diffraction orders (not shown) such as in the −1, +1, −2, +2, . . . −mth, +mth diffraction orders which are offset on either side of the zeroth diffraction order. One property of an array waveguide diffraction grating (AWG) transmission filter 54 is that a spacing (d) of the phase shifted array waveguides 54c, and the wavelength and polarization of a channel from the lasers 52a–52d determines the location of the non-zero diffraction order. Each non-zero diffraction order experiences an angular dispersion, and higher diffraction orders more efficiently separate individual wavelengths. The demultiplexing function of the AWG transmission filter 54 is merely a reverse of the multiplexing function described hereinabove. The AWG transmission filter/multiplexer 54 is subject to the same free spectral range requirements as for the transmission filter/multiplexer 4500 of laser system 4000.

The laser system 50 shares the same fundamental advantages as described hereinbefore for the laser system 4000 of FIG. 4.

Figure 7:
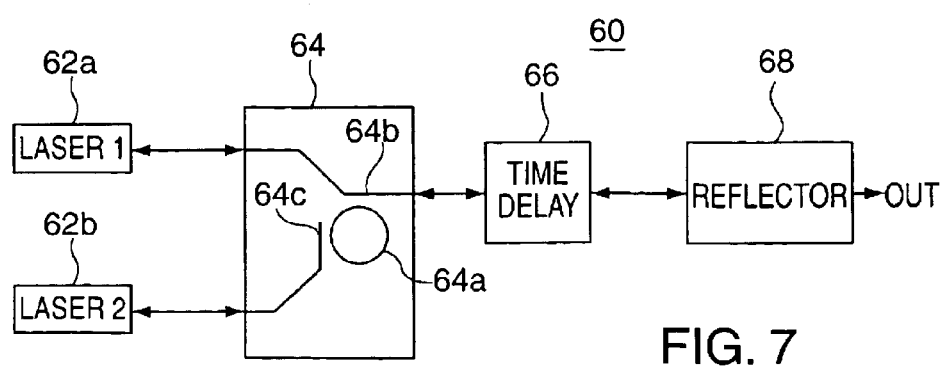
FIG. 7 is a block diagram of an alternative multi-laser system including an ring resonator multiplexing transmission filter and a feedback mechanism in a fundamental output of the multiplexing filter in accordance with the concept of the first embodiment of the present invention.

Referring now to FIG. 7, there is shown an exemplary implementation of the laser system 4000 of FIG. 4, namely a block diagram of a multi-laser system 60 comprising a single feedback mechanism in a primary output of an optical transmission filter/multiplexer 64 that provides stabilizing optical feedback in one of two predetermined polarization states and within a respective one of two predetermined wavelength bands to a respective one of two optical radiation sources (LASER 1, LASER 2) 62a and 62b in accordance with the first embodiment of the present invention.

The laser system 60 comprises the two optical radiation sources 62a and 62b of various predetermined wavelengths and polarizations, the optical transmission filter/multiplexer 64 that performs multiplexing and demultiplexing in the optical wavelength and/or polarization domains comprises two input/outputs and one output/input, an optional time delay 66, and a reflector 68 serially connected together such that polarization is substantially maintained across each connection point. The output of each of the optical radiation sources 62a and 62b is substantially polarized in a respective linear polarization and these polarizations are substantially aligned to one of the principle polarization axes of the two respective transmission filter/multiplexer 64 inputs. If the two stabilized radiation sources 62a and 62b have substantially the same predetermined wavelength band then the polarizations of the respective optical radiation sources 62a and 62b must be substantially aligned to orthogonal principle polarization axes of the respective inputs of the transmission filter/multiplexer 64.

The optical radiation sources 62a and 62b behave substantially the same as the radiation sources 4200 of the laser system 4000. Each of the two inputs of the transmission filter/multiplexer 64 are designed to pass a respective predetermined wavelength band that falls within a predetermined wavelength range of the respective optical radiation sources 62a and 62b to the output of the optical transmission filter/multiplexer 64. Simultaneously the optical transmission filter/multiplexer 64 multiplexes the input signals in the optical wavelength and/or polarization domains, and transmits this filtered, combined signal to the primary output of the transmission filter/multiplexer 64 and, in turn, passes this combined signal to the optional time delay 66 and then to the reflector 68. The reflector 68 is arranged to pass a predetermined major first portion of the optionally delayed composite optical signal from the transmission filter/multiplexer 64 as a composite optical output signal from the laser system 60, and to reflect a predetermined remaining second portion of the optionally delayed composite optical signal back towards the optional time delay 66 as a respective feedback signal of predetermined polarizations and wavelengths. The reflector 68 input and reflected composite optical signals are substantially the same in optical properties as in, for example, polarization and wavelength. The composite feedback signal then passes again through the optional time delay 66 and into the optical transmission filter/multiplexer 64 where the composite signal is separated by respective wavelength and/or polarization and directed to the respective two transmission filter/multiplexer 64 inputs. Each of the two transmission filter/multiplexer 64 inputs passes only a predetermined band of wavelengths and/or polarization from the incident composite signal to the respective outputs of the two optical radiation sources 62a and 62b. The process of feedback and amplification continues in a manner substantially the same as that described hereinbefore for the laser system 4000 of FIG. 4 until a steady state output is achieved for the two optical radiation sources 62a and 62b, the properties of each of which are substantially determined by the two respective transmission filter/multiplexer 64 inputs, the optional time delay 66, the reflector 68, and the two respective resonant systems which are formed between the respective high reflectance endfaces of the two optical radiation sources 62a and 62b and the reflector 68. The resultant respective feedback substantially determines the output properties (e.g., wavelength, output optical power and stability over time, and environmental conditions) of the two respective optical radiation sources 62a and 62b.

The exemplary optical transmission filter/multiplexer 64 shown in FIG. 7 is known in the art as a ring resonator 64 in the system 60. In the ring resonator 64, each of the optical signals from the radiation sources 62b and 62c are coupled into a ring 64a where they are filtered and multiplexed as is well know in the art. More particularly, filtering is produced by coupling part of each of the input optical signals into the ring 64a for propagation therein. For example, when part of the optical signal from laser 62a is coupled into the ring 64a from path 64b it propagates around the ring 64a. When part of this propagated signal couples back to the path 64b, certain predetermined wavelengths interfere constructively with those in path 64b, while other predetermined wavelengths interfere destructively with those in path 64b. The wavelengths that are constructively interfered with in path 64b are enhanced while those that are destructively interfered with in the path 64b are suppressed. From the output of path 64b the signals pass straight through to the primary output of the ring resonator 64 and to the input of the optional time delay 66 or directly to the reflector 68. A similar operation occurs with the optical signal from the laser 62b. There, the optical signal in path 64c experiences constructive or destructive interference for predetermined wavelengths with a part of the signal that has already propagated around the ring 64a from laser 62b. The wavelengths that are constructively and destructively interfered with are dependent on the optical length of the ring 64a as is well know in the art. The wavelengths that were not destructively interfered with continue propagating in the ring 64a and are coupled into the path 64b and out to the optional time delay 66 or directly to the reflector 68 as a multiplexed output optical signal from the radiation sources 62a and 62b.

The laser system 60 shares the same fundamental advantages as described hereinbefore for the laser system 4000 of FIG. 4.

Figure 8:
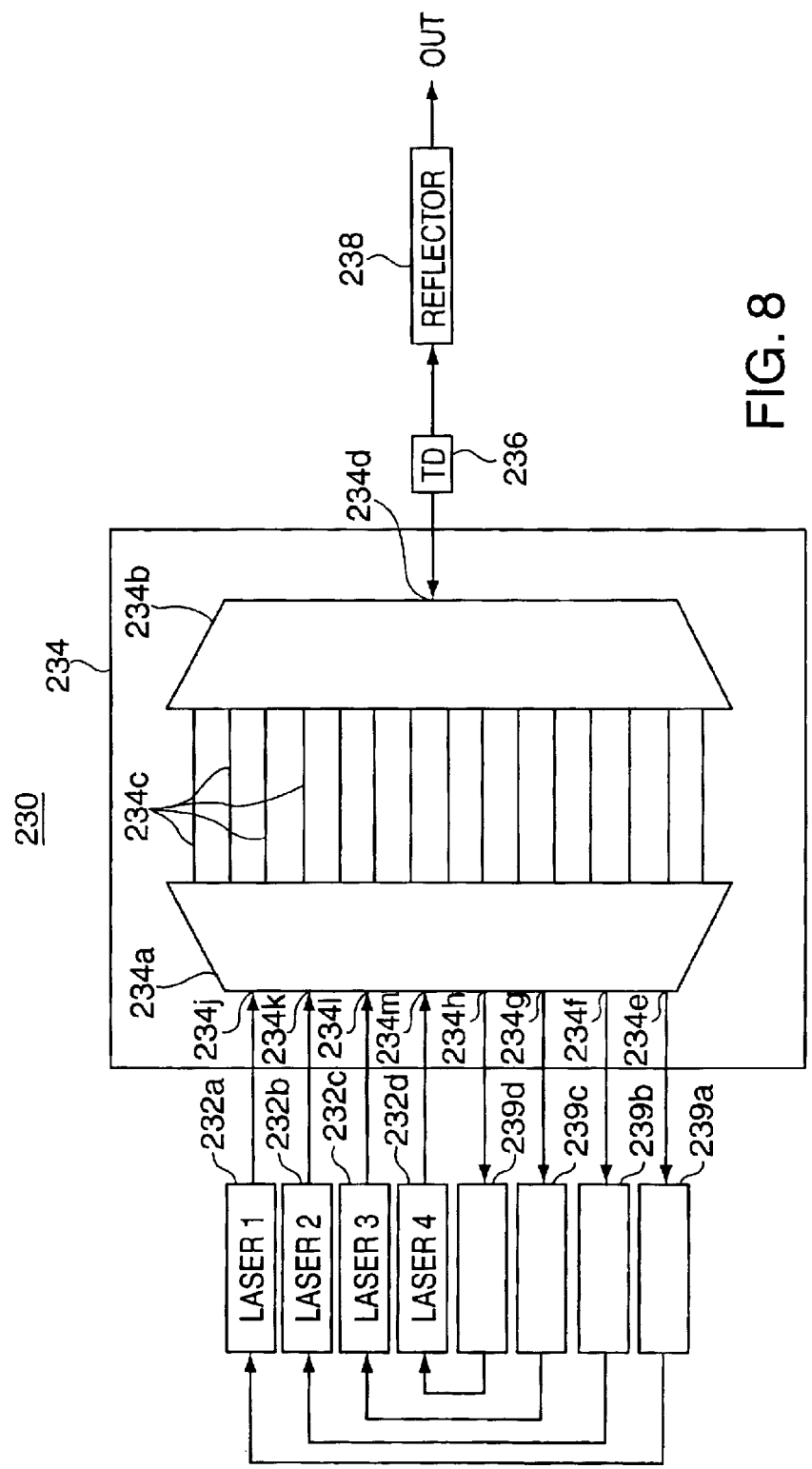
FIG. 8 is a block diagram of an alternative multi-laser system including an array waveguide grating multiplexing transmission filter and a feedback mechanism in a fundamental output of the multiplexing filter similar to that shown in the system of FIG. 6, and photodetectors coupled to predetermined input ports of the transmission filter for stabilizing lasers in accordance with the concept of the first embodiment of the present invention.

Referring now to FIG. 8, there is shown a block diagram of a multi-laser system 230 that is a modification of the laser system 4000 of FIG. 4, and comprises a single feedback mechanism (TD Time Delay 236 and REFLECTOR 238) in a zeroth-order ((m=0) output 234d of an optical AWG transmission filter/multiplexer 234 which provides stabilizing optical feedback in one of two predetermined polarization states and within a respective one of four predetermined wavelength bands to a respective one of four optical radiation sources 232a–232d in accordance with the first embodiment of the present invention. Signals reflected from the reflector 238 are also separated by the optical AWG transmission filter/multiplexer 234 via a higher diffraction [m<>0 (m does not equal zero)] and directed to photodetectors 239a–239d. An output from each of the photodetectors 239a–239d is used to further stabilize and control the respective one of the optical radiation sources 232a–232d as is described hereinbelow.

The laser system 230 comprises the four optical radiation sources 232a–232d that generate various wavelengths and polarizations, the an array waveguide grating (AWG) transmission filter/multiplexer 234 comprising a first Free Propagating Region (FPR) 234a comprising four inputs coupled to the radiation sources 234a–234d and four outputs 234e–234h that are coupled to photodetectors 239a–239d, respectively, a second FPR 234b comprising a fundamental output (m=0) 234d that is coupled to a feedback mechanism comprising the optional time delay 236 and the reflector 238 similar to what is shown in the system 50 of FIG. 6 The radiation sources 232a–232d, AWG transmission filter/multiplexer 234, reflector 238, and photodetectors 239a–239d are connected together such that polarization is substantially maintained across each connection point. A coupling which is electrical, not optical, in nature exists between the photodetectors 239a–239d and the respective lasers 232a–232d and is implemented via standard means such as digital and/or analog electrical control circuits (not shown). The output of each of the optical radiation sources 232a–232d is substantially polarized in a respective linear polarization. These polarizations are substantially aligned to one of the principle polarization axes of the respective inputs 234a–234d of the plurality of transmission filter/multiplexer 234 inputs. No more than two of the stabilized radiation sources 232a–232d may have substantially the same predetermined wavelength band. If two stabilized radiation sources 232a–232d have substantially the same predetermined wavelength band, then the polarizations of the respective optical radiation sources 232a–232d must be substantially aligned to orthogonal principle polarization axes of the respective inputs 234a–234d of the transmission filter/multiplexer 234.

The optical radiation sources 232a–232d behave substantially the same as the radiation sources 52a–52d of the laser system 50 of FIG. 6. Each of the inputs 234j–234m of the transmission filter/multiplexer 234 from the optical radiation sources 232a–232d are designed to pass a respective predetermined wavelength band that falls within the predetermined wavelength range of the associated optical radiation sources 232a–232d to the output 234d of the optical transmission filter/multiplexer 234. Simultaneously, the optical transmission filter/multiplexer 234 multiplexes these inputs in the optical wavelength and/or polarization domains and transmits this filtered, multiplexed signal to the fundamental output 234d of the transmission filter/multiplexer 234 and, in turn, passes this composite signal to the optional time delay 236 and then to the reflector 238. The reflector 238 is arranged to pass a predetermined major first portion of the optionally delayed composite optical signal from the transmission filter/multiplexer 234 as a composite optical output signal from the laser system 230, and to reflect a predetermined remaining second portion of the optionally delayed composite optical signal back towards the time delay 236 as a respective feedback signal of predetermined polarizations and wavelengths. The reflector 238 input and the reflected composite optical signals are substantially the same in optical properties as in for example polarization and wavelength. The composite feedback signal then passes again through the optional time delay 236 and into the optical transmission filter/multiplexer 234 where a major portion of the composite feedback signal is separated by respective wavelength and/or polarization and directed to the respective four inputs 232a–234d of the transmission filter/multiplexer 234. A minor portion of the composite feedback signal is separated by respective wavelength and/or polarization and directed to the respective four outputs 234e–234h of the first FPR 234a of the transmission filter/multiplexer 234 and then to respective photodetectors 239a–239d. Each of the four inputs 234j–234m of the transmission filter/multiplexer 234 passes only a predetermined band of wavelengths and/or polarization from the incident composite feedback signal to the respective outputs of the four optical radiation sources 232a–232d and from the four outputs 234e–234h to the respective photodetectors 239a–239d. The process of feedback and amplification continues in a manner substantially the same as that disclosed hereinbefore for the laser system 50 of FIG. 6 until a steady state output is achieved for the four optical radiation sources 232a–232d, the properties of each of which are substantially determined by the four respective inputs 234j–234m of the transmission filter/multiplexer 234, the optional time delay 236, the reflector 238, and the four respective resonant systems which are formed between the respective high reflectance endfaces of the four optical radiation sources 232a–232d and the reflector 238. The resultant respective feedback substantially determines the output properties (e.g., wavelength, output optical power and stability over time, and environmental conditions) of the four respective optical radiation sources 232a–232d.

The laser system 230 shares the same fundamental advantages as described hereinbefore for the laser system 50 of FIG. 6 with the additional advantage of detection via the photodetectors 239a–239d of respective signals which are proportional to the output of the laser system 230 for each respective laser 232a–232d. This detected power can be used as is well known in the art to control the individual stabilized optical radiation sources with respect to parameters such as optical power, and balancing the optical powers of pairs of orthogonally polarized stabilized radiation sources 232a–232d of similar wavelength, such that the degree of polarization of the output of the system 230 is adjusted and controlled.

Referring now to FIGS. 9, 10, 11, 12, 13, 14, 15, 16, 17, 18, and 19, there are shown block diagrams of laser systems 5000, 7000, 6000, 70, 80, 90, 100, 130, 140, 150, and 160, respectively, which show the concept of including at least one respective reflective or effective feedback mechanism 5800, 7800, 6800, 78, 88a–88d, 98a–98b, 105, 135, 148, 158 and 168a–168b located in a higher diffraction order or secondary output of a transmission filter (XMIT FILTER) 5400, an optical transmission filter/multiplexer 7500, an optical combiner 6500, and transmission filter/multiplexers 74, 84, 94, 104, 134, 144, 154, and 164, respectively, in accordance with a second embodiment of the present invention.

A fundamental output is defined to be either a primary or zero-order output port. A primary output is defined to be the maximum power output port of a transmission filter 5400, optical combiner 6500, or a combination transmission filter/multiplexer 7500, 144, 154 that operates based on the interference of light. A zeroth-order output is defined to be the maximum power output port of a transmission filter 5400 or a combination transmission filter/multiplexer 7500, 74, 84, 94, 134, 104, 164 that operates based on the diffraction and interference of light.

A secondary output is defined to be a less than maximum power output port of a transmission filter 5400, optical combiner 6500, or a combination transmission filter/multiplexer 7500, 144, 154 that operates based on the interference of light. A higher-order output is defined to be an output having less than maximum power output of a transmission filter 5400 or a combination of a transmission filter/multiplexer 7500, 74, 84, 94, 134, 104, 164 that operates based on the diffraction and interference of light.

To achieve stable radiation source or laser operation, the entire apparatus of each of the laser systems 5000, 7000, 6000, 70, 80, 90, 100, 130, 140, 150, and 160 is polarization maintaining in that each of the components comprising each apparatus is polarization maintaining wherein each of these components can be described from an optical polarization perspective by the identification within each component of two principle axes of polarization that are not equal with respect to an effective refractive index and/or optical propagation loss. Furthermore, the components of each of the laser systems 5000, 7000, 6000, 70, 80, 90, 100, 130, 140, 150, and 160 are all relatively orientated and fixed in place such that their principle axes are nominally aligned.

In the laser systems 5000, 7000, 6000, 70, 80, 90, 100, 130, 140, 150, and 160, the respective optional time delays 5600, 7600, 6600, 76, 86a–86d, 96a–96b, 106, 136, 146, 156, and 166a–166b, respectively, when included, introduce a respective predetermined delay in the optical signal passing there through in either direction. Therefore, the optional time delays 5600, 7600, 6600, 76, 86a–86d, 96a–96b, 106, 136, 146, 156, and 166a–166b introduce a respective predetermined time delay into the feedback signal for transmission as a predetermined incoherent or partially-coherent signal back through the respective one of a group of transmission filter 5400, transmission filter/multiplexers 7500, 74, 84, 94, 104, 134, 144, 154, and 164, and optical combiner 6500 when such incoherent signal is required to stabilize the respective optical radiation sources 5200, 7200a–7200n, 6200a–6200n, 72a–72d, 82a–82d, 92a–92d, 102a–102d, 132a–132d, 142a–142b, 152a–152b, and 162a–162b. Without the respective time delays 5600, 7600, 6600, 76, 86a–86d, 96a–96b, 106, 136, 146, 156 and 166a–166b included in the respective laser systems 5000, 7000, 6000, 70, 80, 90, 100, 130, 140, 150, and 160, a coherent feedback signal is provided to stabilize the respective optical radiation sources 5200, 7200a–7200n, 6200a–6200n, 72a–72d, 82a–82d, 92a–92d, 102a–102d, 132a–132d, 142a–142b, 152a–152b, and 162a–162b. These optional time delays 5600, 7600, 6600, 76, 86a–86d, 96a–96b, 106, 136, 146, 156, and 166a–166b can comprise any suitable time delay such as an optical path length.

In the laser systems 5000, 7000, 6000, 70, 80, 90, 140, 150 and 160, the respective reflectors 5800, 7800, 6800, 78, 88a–88d, 98a–98b, 148, 158, and 168a–168b can comprise any suitable mirror such as a loop mirror, dielectric mirror, metal mirror, refractive index discontinuity, or other suitable reflector device. These reflectors 5800, 7800, 6800, 78, 88a–88d, 98a–98b, 148, 158, and 168a–168b are all optionally tunable so that the laser system properties which are influenced by feedback (e.g., wavelength, output optical power and stability over time and environmental conditions) can be optimized.

When the laser systems 7000, 6000, 70, 80, 90, 100, 130, and 140 operate with high power, a respective optional power tap 7900, 6900, 79, 89, 99, 109, 119, and 139 coupled to a respective optical power monitor 7700, 6700, 77, 87, 97, 107, 117, and 137 can be included in the system fundamental output which can be used to monitor back-reflections for detecting fiber breaks in the respective systems and to shut down the respective radiation sources 7200a–7200n, 6200, 72a–72d, 82a–82d, 92a–92d, 102a–102d, and 132a–132d should such breaks occur.

When the laser systems 7000, 6000, 70, 80, 90, 100, 130, 140, 150, and 160 are intended to be used for amplification, a depolarized optical output may be desired in order to minimize the polarization dependence of such amplifiers. This can be effectively achieved in the following multi-laser systems when used in practical fiber-optic telecommunications systems by using an even number of respective optical radiation sources 7200a–7200n, 6200a–6200n, 72a–72d, 82a–82d, 92a–92d, 102a–102d, 132a–132d, 142a–142b, 152a–152b, and 162a–162b and configuring the radiation sources 7200a–7200n, 6200a–6200n, 72a–72d, 82a–82d, 92a–92d, 102a–102d, 132a–132d, 142a–142b, 152a–152b, and 162a–162b such that they are grouped in pairs which are orthogonally polarized and whose wavelengths differ by an amount of up to 60 nm. The smaller the wavelength separation in general results in reduced amplifier polarization sensitivity. The output of such a laser system is said to substantially depolarized or equivalently to posses low degree of polarization (DOP).

Figure 9:
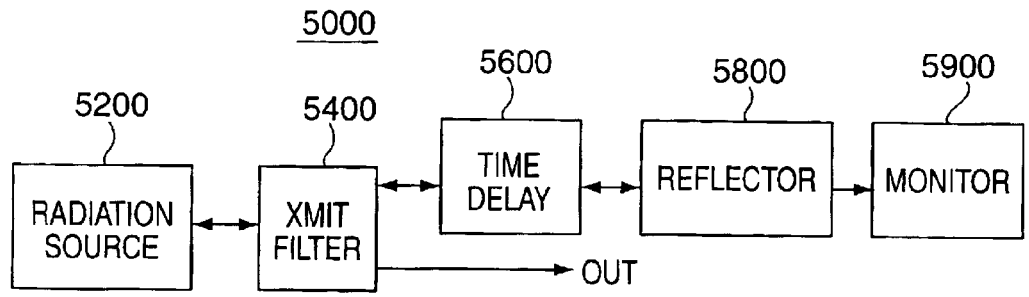
FIG. 9 is a block diagram of a laser system comprising a single feedback mechanism in a higher diffraction order or secondary output of an optical transmission filter that provides a stabilizing optical feedback in a predetermined polarization state and wavelength band to an optical radiation source in accordance with the second embodiment of the present invention.

Referring now to FIG. 9, there is shown a block diagram of a laser system 5000 comprising a single feedback mechanism in a higher or secondary order output of an optical transmission filter (Xmit Filter) 5400 that provides a stabilizing optical feedback in a predetermined polarization state and within a predetermined wavelength band to an optical radiation source 5200 in accordance with the second embodiment of the present invention.

The laser system 5000 comprises the optical radiation source 5200, the transmission filter 5400, an optional time delay 5600, a reflector 5800, and an optional monitor 5900 connected together such that polarization is substantially maintained across each connection point. The output of the optical radiation source 5200 is substantially polarized in a single polarization and this polarization is substantially aligned to one of the principle polarization axes of the transmission filter 5400. The optical radiation source 5200 may be a semiconductor laser with a high reflectance coating on the back facet and a low reflectance coating on the front facet, the front facet being taken as the optical radiation source 5200 output. Due to this configuration, stimulated emission from the optical radiation source 5200 is relatively small and as a result the optical radiation source 5200 selectively generates an output light signal over a relatively wide predetermined wavelength range that is transmitted to an input of the transmission filter 5400. The transmission filter 5400 is designed to pass a predetermined wavelength band that falls within the predetermined wavelength range of the optical radiation source 5200 to its fundamental output and, in turn, to the output of the laser system 5000. This same predetermined wavelength band is also passed to at least one higher or secondary order output of the transmission filter 5400 and, in turn, to the optional time delay 5600 and then to the reflector 5800. The reflector 5800 is arranged to reflect a predetermined major first portion of the optionally delayed optical signal from the optional time delay 5600 back towards the optional time delay 5600 as a feedback signal of predetermined polarization and wavelength and transmit a predetermined remaining second portion of the optionally delayed optical signal to an optional signal monitor 5900 such as an optical detector or spectrum analyzer. The reflector 5800 input and reflected optical signals are substantially the same in optical properties as in, for example, polarization and wavelength. The feedback signal then passes again through the optional time delay 5600 and transmission filter 5400 before entering the optical radiation source 5200 output. The feedback signal propagates through the laser 5200 from the output (low reflectance) endface to the high reflectance endface and is substantially reflected from the high reflectance endface back to the output (low reflectance) endface of the laser 5200, in the process resulting in substantial stimulated emission and hence gain in the power of the particular wavelengths comprising the feedback. Only feedback in the same polarization as the initial optical radiation source 5200 output will experience significant gain. This process of feedback and amplification continues until a steady state optical radiation source 5200 output is achieved, the properties of which are substantially determined by the transmission filter 5400, optional time delay 5600, reflector 5800, and the resonant system which is formed between the high reflectance endface of the optical radiation source 5200 and the reflector 5800. The resultant feedback substantially determines the output properties (e.g., wavelength, output optical power and stability over time, and environmental conditions) of the optical radiation source 5200.

The transmission filter 5400 can comprise any suitable filter having higher or secondary order outputs as, for example an Array Waveguide Grating (AWG), a Diffraction Grating, an asymmetric Mach Zehnder Interferometer, a grating assisted coupler, or ring resonator.

A first fundamental difference and an advantage in the laser system 5000 over that of a laser system employing a transmission filter with the reflector connected to the fundamental output is that the laser system 5000 is able to take advantage of the fact that many types of transmission filters cannot direct all of an input signal to the fundamental output, allowing some predetermined amount of the same signal to appear at higher diffraction order or secondary outputs. By reflecting a higher diffraction order or secondary output rather than the fundamental output to stabilize the radiation sources, an increase in laser system output power is realized since a) the higher diffraction order or secondary signal would normally be discarded, and b) the fundamental output no longer has a reflecting element in the path which itself results in reduced output power due to it's reflecting nature and also possibly it's loss.

A second fundamental difference and advantage in the laser system 5000 over that of the conventional Fiber Bragg Grating (FBG) approach shown in FIG. 1 and over that of a laser system 30 employing a reflector 38 connected to the fundamental output, is that in the case of the reflector 5800 on the higher or secondary order output, the amount of reflection can be adjusted without resulting in a variable transmittance between the fiber grating or transmission filter fundamental output and the system output which should allow radiation source properties influenced by feedback (e.g., wavelength, power and stability over time and environmental conditions) to be adjusted substantially independently from system output power.

A third fundamental difference and an advantage in the laser system 5000 over that of the conventional Fiber Bragg Grating (FBG) approach shown in FIG. 1 is the ability to decouple the filtering function of the transmission filter 5400 from the function of the reflector 5800. This permits the use of many filter architectures and additional design freedoms in component placement and design.

Figure 10:
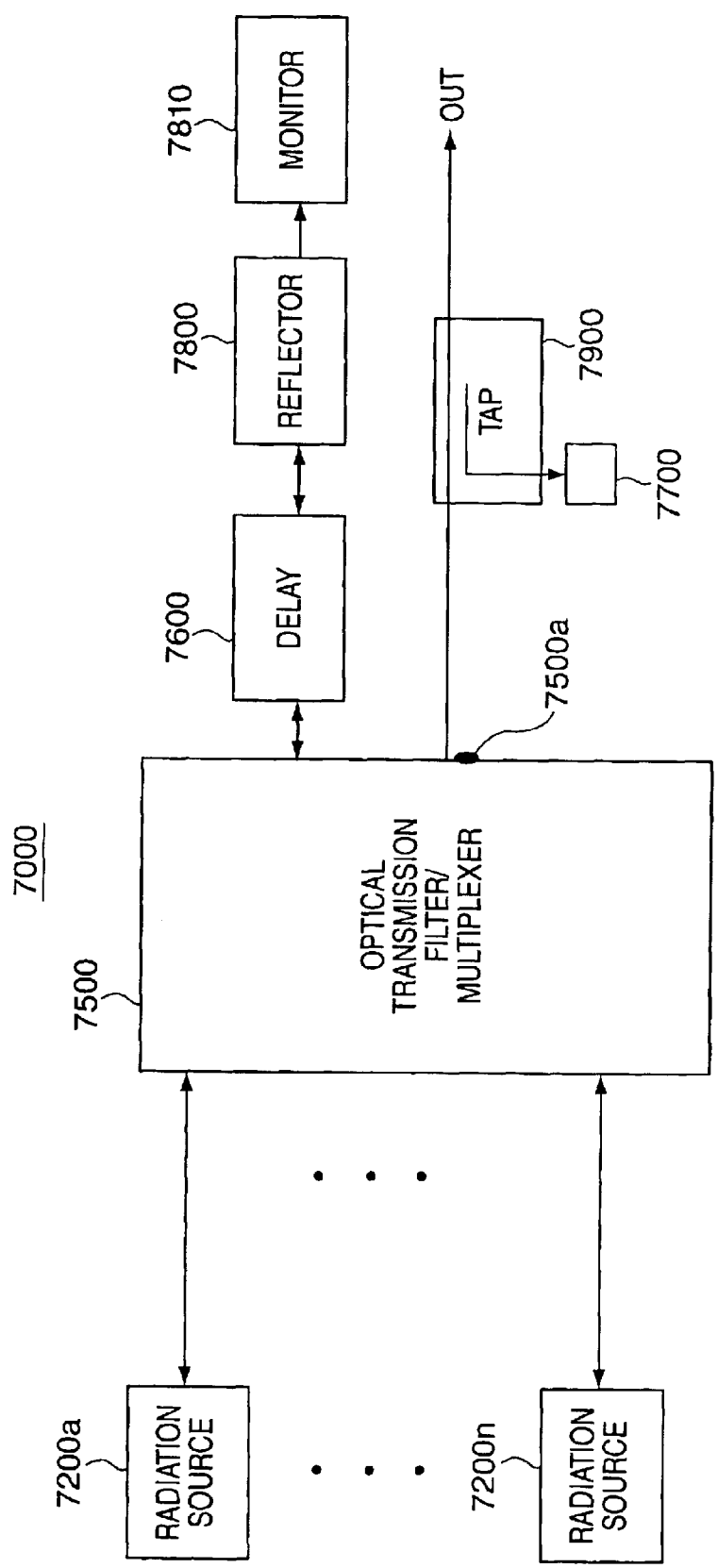
FIG. 10 is a block diagram of a multi-laser system comprising a single feedback mechanism in a secondary or higher output of an optical transmission filter/multiplexer that provides stabilizing optical feedback in one of two predetermined polarization states and a plurality of predetermined wavelength bands to a plurality of optical radiation sources in accordance with a second embodiment of the present invention.

Referring now to FIG. 10, there is shown a block diagram of a multi-laser system 7000 comprising a single feedback mechanism 7600 (DELAY), 7800 (REFLECTOR) in a secondary or higher diffraction order (m<>0) or secondary output of an optical transmission filter/multiplexer 7500 that provides a stabilizing optical feedback signal in one of two predetermined polarization states and within a respective plurality of predetermined wavelength bands to a respective plurality of optical radiation sources 7200a–7200n in accordance with the second embodiment of the present invention.

The laser system 7000 comprises a plurality of optical radiation sources 7200a–7200n (of which only radiation sources 7200a and 7200n are shown) generating various wavelengths and/or polarizations. The optical transmission filter/multiplexer 7500 comprises a plurality of inputs and outputs which performs multiplexing and demultiplexing in the optical wavelength and/or polarization domains, at least one higher diffraction order or secondary output with a serial connection of the optional time delay 7600, the reflector 7800, and an optional monitor 7810, and a fundamental output 7500a coupled to an optional optical tap 7900 that is coupled to a monitor 7700. The plurality of radiation sources 7200a–7200n are coupled to separate input ports of the optical transmission filter/multiplexer 7500. The optional time delay 7600 and the reflector 7800 are serially connected to a higher diffraction order or secondary output of the optical transmission filter/multiplexer 7500, and these elements are further connected together such that polarization is substantially maintained across each connection point. The output of each of the plurality of optical radiation sources 7200a–7200n is substantially polarized in a respective linear polarization, and these polarizations are substantially aligned to one of the principle polarization axes of the respective inputs of the plurality of transmission filter/multiplexer 7500. No more than two of the stabilized radiation sources 7200a–7200n may have substantially the same predetermined wavelength band. If two stabilized radiation sources of the radiation sources 7200a–7200n have substantially the same predetermined wavelength band, then the polarizations of the two respective optical radiation sources 7200a–7200n must be substantially aligned to orthogonal principle polarization axes of the respective transmission filter/multiplexer 7500 inputs.

The optical radiation sources 7200a–7200n may be semiconductor lasers with a high reflectance coating on the back facet and a low reflectance coating on the front facet, the front facet thereof being taken as the output of each of the optical radiation source 7200a–7200n. Due to this configuration, the respective stimulated emissions from each of the plurality of optical radiation sources 7200a–7200n are relatively small and as a result each of the optical radiation sources 7200a–7200n selectively generate a respective output light signal over a relatively wide respective predetermined wavelength range that is transmitted to the respective inputs of the plurality of transmission filter/multiplexer 7500 inputs. Each of the plurality of transmission filter/multiplexer 7500 inputs are designed to pass a respective predetermined wavelength band that falls within the predetermined wavelength range of the respective optical radiation sources 7200a–7200n, while simultaneously, multiplexing these inputs in the optical wavelength and/or polarization domains, and transmitting a major portion of this filtered and composite signal to the fundamental output of the optical transmission filter/multiplexer 7500. A minor portion of the composite output signal is also passed to at least one higher diffraction order or secondary output of the optical transmission filter/multiplexer 7500 and, in turn, to the optional time delay 7600, the reflector 7800, and the optional monitor 7810. The reflector 7800 is arranged to reflect all or a predetermined major first portion of the optionally delayed optical signal from the optical transmission filter/multiplexer 7500 back towards the optional time delay 7600 as a respective feedback signal of predetermined polarization and wavelength, and transmit none or a predetermined remaining second portion of the optionally delayed optical signal respectively to an optional signal monitor 7810 such as an optical detector or spectrum analyzer.

The purpose of the monitor 7810 is to allow the measurement of the optical properties of the optical radiation sources 7200a–7200n so that lifetime and impact on system performance can be continuously updated.

The input signal of the reflector 7800 and its reflected composite optical signal are substantially the same in optical properties as in, for example, polarization and wavelength. The composite feedback signal then passes again through the optional time delay 7600 and into the optical transmission filter/multiplexer 7500 where the composite signal is separated by respective wavelength and/or polarization, and directed to the respective plurality of inputs of the optical transmission filter/multiplexer 7500. Each of the plurality of inputs of the optical transmission filter/multiplexer 7500 directs only a predetermined band of wavelengths and/or polarization from the incident composite signal to the respective outputs of the plurality of optical radiation sources 7200a–7200n. Each of the plurality of respective feedback signals propagate through the respective laser 7200a–7200n from the output (low reflectance) endface to the high reflectance endface and is substantially reflected from the high reflectance endface back to the output (low reflectance) endface of the respective laser 7200a–7200n. With the process, a substantial stimulated emission results, and hence a gain in the power of the particular wavelengths comprising the respective feedback. Only feedback in the same polarization as is found in an initial respective output of one of the optical radiation source 7200a–7200n will experience significant gain. This process of feedback and amplification continues until a steady state output is achieved for the plurality of optical radiation sources 7200a–7200n, the properties of each of which are substantially determined by the respective plurality of inputs of the optical transmission filter/multiplexer 7500, the optional time delay 7600, the reflector 7800, and the respective resonant systems which are formed between the respective high reflectance endfaces of the plurality of optical radiation sources 7200a–7200n and the reflector 7800. The resultant respective feedback substantially determines the output properties (e.g., wavelength, output optical power and stability over time, and environmental conditions) of the plurality of respective optical radiation sources 7200a–7200n.

The optical transmission filter/multiplexer 7500 can comprise any suitable transmission filter/multiplexer having one or more higher or secondary output and of finite free spectral range which is capable of multiplexing in the wavelength and/or polarization domains as, for example, an Array Waveguide Grating (AWG) or a Diffraction Grating, or an asymmetric Mach Zehnder Interferometer or a concatenation of Asymmetric Mach Zehnder Interferometers. The free spectral range of the optical transmission filter/multiplexer 7500 is chosen to be wider than the substantial majority of the output predetermined wavelength range of the unstabilized optical radiation sources 7200a–7200n so that only a single wavelength band is output from each of the optical radiation sources 7200a–7200n. If this condition were not met, it would be possible for a single stabilized optical radiation source (e.g., 7200a) to output multiple predetermined wavelength bands some of which may overlap with the predetermined wavelength bands of other stabilized optical radiation sources 7200b–7200n, resulting in the sharing of feedback signals. This sharing of feedback signals between optical radiation sources 7200a–7200n may result in unstable operation as the amount of feedback to a particular optical radiation source (e.g., 7200a) will increase and decrease as the output powers of other stabilized optical radiation sources 7200b–7200n are adjusted. The sharing of feedback by optical radiation sources 7200a–7200n will also result in their stabilized outputs becoming correlated which will tend to decrease the depolarization of the laser system 7000 output.

A first fundamental difference and an advantage in the laser system 7000 over that of the conventional Fiber Bragg Grating (FBG) approach shown in FIG. 1 is that since the optical transmission filter/multiplexer 7500 functions are occurring simultaneously and are a part of the respective resonant structures that substantially determine the laser system 7000 output, the system 7000 is effectively "self-aligning" with respect to wavelength and polarization as opposed to the laser system 10 of FIG. 1 where the wavelengths of the lasers 12a–12n are determined by the fiber gratings 16, these individual outputs then being combined in the WDM 18. In the case of the laser system 10, should the WDM wavelength passbands change relative to the wavelength outputs from the fiber gratings 16, as is usually the case with environmental conditions (e.g., temperature, pressure, humidity and mechanical stress for example) and over time, the output power of the laser system 10 will be reduced due to this wavelength misalignment. In the case of the laser system 7000, the optical transmission filter/multiplexer 7500 simultaneously defines the laser system 7000 output passband wavelengths and the stabilized output passband wavelengths of the radiation sources 7200a–7200n, and simultaneously multiplexes these wavelengths before outputting them from the laser system 7000. Over environmental conditions (e.g., temperature, pressure, humidity, and mechanical stress, for example) and over time, the output power of the laser system 7000 will not be reduced due to wavelength misalignment since this alignment is substantially eliminated.

A second fundamental difference and an advantage in the laser system 7000 over that of a laser system employing an optical transmission filter/multiplexer with the reflector on the fundamental output as is shown in, for example, FIGS. 4, 5, 6, 7, 8 is that the laser system 7000 is able to take advantage of the fact that many types of optical transmission filter/multiplexers cannot direct all of an input signal to the fundamental output, allowing some predetermined amount of a same signal to appear at higher diffraction orders. By reflecting a higher diffraction order rather than the fundamental output to stabilize the radiation sources, an increase in laser system output power is realized since a) the higher diffraction order signal would normally be discarded and b) the fundamental output no longer has a reflecting element in the path which itself results in reduced output power due to it's reflecting nature and also possibly it's loss.

A third fundamental difference and advantage in the laser system 7000 over that of the conventional Fiber Bragg Grating (FBG) approach shown in FIG. 1 and over that of a laser system 30 employing a reflector on the fundamental output shown in, for example FIGS. 4, 5, 6, 7, and 8, is that, in the case of the reflector on the higher diffraction order or secondary order output, the amount of reflection can be adjusted without resulting in a variable transmittance between the transmission filter/multiplexer fundamental output and the system output which should allow laser properties influenced by feedback (e.g., wavelength, power stability over time and environmental conditions) to be adjusted substantially independently from system output power.

A fourth fundamental difference and an advantage in the laser system 7000 over that of the conventional Fiber Bragg Grating (FBG) approach shown in FIG. 1 is the ability to decouple the filtering function of the plurality of transmission filter/multiplexer 7500 inputs from the function of the reflector 7800 which permits the use of many filter architectures and additional design freedoms in component placement and design as is shown hereinafter for the second embodiment and for subsequent embodiments of the present invention.

Figure 11:
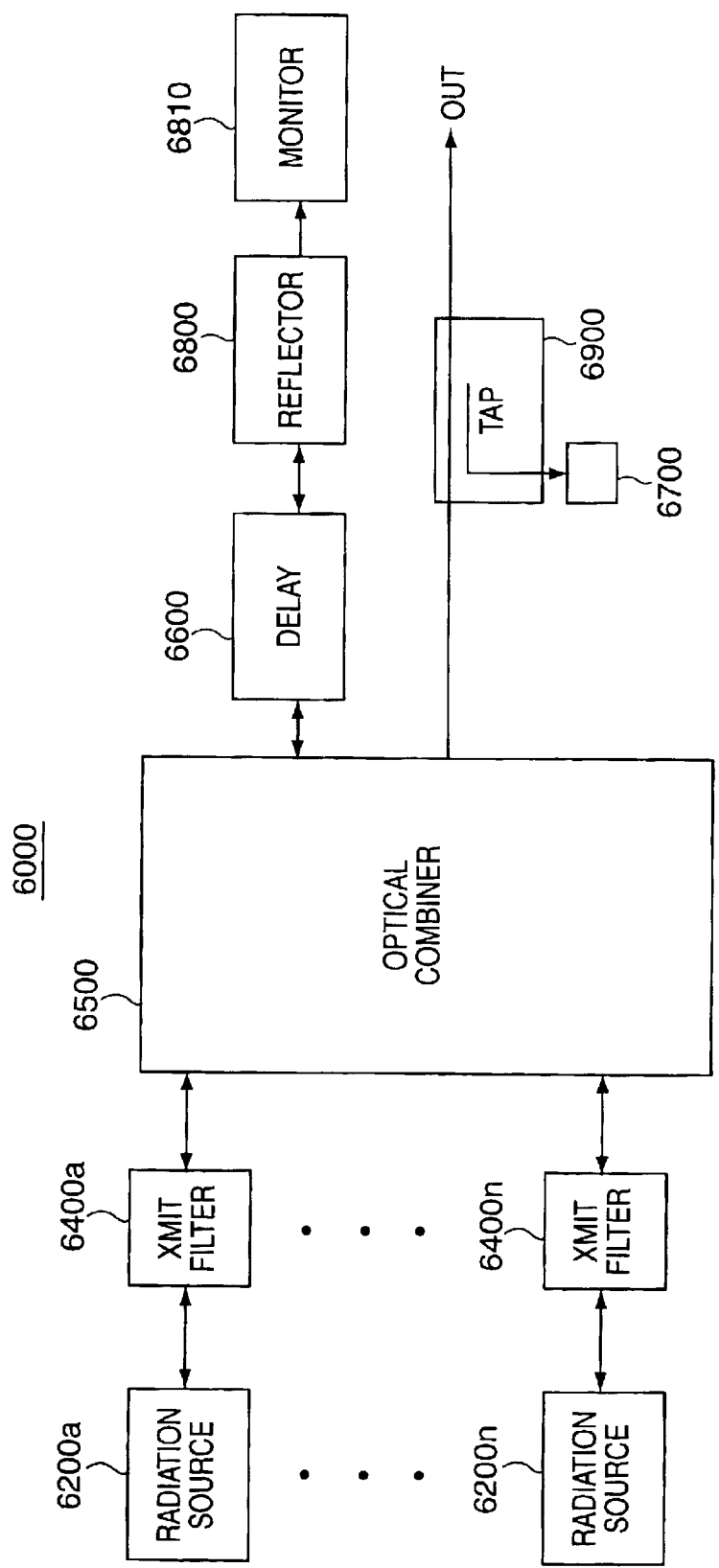
FIG. 11 is a block diagram of a multi-laser system comprising a single feedback mechanism in a secondary output of an optical combiner which provides stabilizing optical feedback in one of two predetermined polarization states and a respective plurality of predetermined wavelength bands to a respective plurality of optical radiation sources in accordance with the second embodiment of the present invention.

Referring now to FIG. 11, there is shown a block diagram of a multi-laser system 6000 comprising a single feedback mechanism in a secondary output of an optical combiner that provides stabilizing optical feedback in one of two predetermined polarization states and within a respective plurality of predetermined wavelength bands to a respective plurality of optical radiation sources 6200a–6200n in accordance with the second embodiment of the present invention.

The laser system 6000 comprises the plurality of optical radiation sources 6200a–6200n (of which only radiation sources 6200a and 6200n are shown) that each generate a predetermined wavelength band and polarization, a plurality of respective transmission filters (Xmit Filter) 6400a–6400n (of which only Xmit Filters 6400a and 6400n are shown), an optical combiner 6500, an optional time delay (Delay) 6600, a reflector 6800, an optional optical monitor 6810, and a fundamental output. The outputs of the plurality of optical radiation sources 6200a–6200n are coupled to inputs of a corresponding ones of the plurality of Xmit Filters 6400a–6400n that have their outputs coupled to separate input ports of the optical combiner 6500. The optical combiner combines the n wavelength bands and polarization(s) from the radiation sources 6200a–6200n into a multiplexed output signal to both a fundamental output that can include an optional optical tap 6900 and monitor 6700, and a secondary order output which is serially connected to the delay 6600, the reflector 6800, and an optional monitor 6810. The radiation sources 6200a–6200n, Xmit Filters 6400a–6400n, combiner 6500, the optional delay 6600, and the reflector 6800 are connected together such that polarization is substantially maintained across each connection point. The output of each of the plurality of optical radiation sources 6200a–6200n is substantially polarized in a respective linear polarization, and these polarizations are substantially aligned to one of the principle polarization axes of the respective plurality of transmission filters 6400a–6400n. No more than two of the transmission filters 6400a–6400n may have substantially the same predetermined wavelength band. If two transmission filters 6400a–6400n have substantially the same predetermined wavelength band then the polarizations of the respective optical radiation sources 6200a–6200n must be substantially aligned to orthogonal principle polarization axes of the respective transmission filters 6400a–6400n.

The transmission filters 6400a–6400n and optical combiner 6500 act essentially as a transmission filter/multiplexer.

The optical radiation sources 6200a–6200n behave substantially the same as the radiation sources 7200a–7200n of the laser system 7000 of FIG. 10. Each of the plurality of transmission filters 6400a–6400n are designed to pass a respective predetermined wavelength band that falls within the predetermined wavelength range of the respective optical radiation sources 6200a–6200n to its output, and then to the optical combiner 6500 where the plurality of transmission filter 6400a–6400n outputs are combined and, in turn, pass this composite signal to the primary output of the optical coupler 6500 as a composite output of the laser system 6000. A portion of the composite output signal is also passed to at least one secondary output of the optical combiner 6500 and, in turn, to the optional time delay 6600, the reflector 6800, and the optional monitor 6810. The reflector 6800 is arranged to reflect all or a predetermined major first portion of the optionally delayed optical signal from the optical combiner 6500 back towards the optional time delay 6600 as a respective feedback signal of predetermined polarization and wavelength, and transmit none or a predetermined remaining second portion of the optionally delayed optical signal respectively to an optional signal monitor 6810 such as an optical detector or spectrum analyzer.

The purpose of the monitor 6810 is to allow the measurement of the optical properties of the optical radiation sources 6200a–6200n so that lifetime and impact on system performance can be continuously updated.

The reflector 6800 input and reflected composite optical signals are substantially the same in optical properties as in, for example, polarization and wavelength. The composite feedback signal then passes again through the optional time delay 6600 and into the optical combiner 6500 where the composite signal is divided in power and/or polarization and directed to the plurality of transmission filters 6400a–6400n. Each of the plurality of transmission filters 6400a–6400n passes only a predetermined band of wavelengths from the incident composite signal to the respective outputs of the plurality of optical radiation sources 6200a–6200n. The process of feedback and amplification continues in a manner substantially the same as that for the laser system 7000 of FIG. 10 until a steady state output is achieved for the plurality of optical radiation sources 6200a–6200n, the properties of each of which are substantially determined by the respective plurality of transmission filters 6400a–6400n, the optional time delay 6600, the reflector 6800, and the respective resonant systems which are formed between the respective high reflectance endfaces of the plurality of optical radiation sources 6200a–6200n and the reflector 6800. The resultant respective feedback substantially determines the output properties (e.g., wavelength, output optical power and stability over time and environmental conditions) of the plurality of respective optical radiation sources 6200a–6200n.

The plurality of transmission filters 6400a–6400n can comprise any suitable filter as, for example, a Long Period Grating (LPG), an Array Waveguide Grating (AWG), a Asymmetric Mach Zehnder interferometer or multiplexer, a Diffraction Grating or dielectric mirror. The optical combiner 6500 can comprise any suitable means of combining optical signals such as a directional coupler, a grating assisted coupler, or a concatenation of directional couplers.

A first fundamental difference and an advantage in the laser system 6000 over that of a laser system employing an optical combiner with the reflector on the fundamental output is that the laser system 6000 is able to take advantage of the fact that optical combiners cannot in general direct multiple input signals to the fundamental output simultaneously without allowing some predetermined amount of the same signals to appear at secondary outputs. By reflecting a secondary rather than the fundamental output to stabilize the radiation sources, an increase in laser system output power is realized since a) the secondary signal would normally be discarded, and b) the fundamental output no longer has a reflecting element in the path which itself results in reduced output power due to it's reflecting nature and also possibly it's loss.

A second fundamental difference and advantage in the laser system 6000 over that of the conventional Fiber Bragg Grating (FBG) approach shown in FIG. 1 and over that of a laser system 3000 shown in FIG. 3 employing a reflector 3800 on the fundamental output is that, in the case of the reflector on the secondary output the amount of reflection can be adjusted without resulting in a variable transmittance between the fiber grating or transmission filter fundamental output, and the system output which should allow laser properties influenced by feedback (e.g., wavelength, power stability over time and environmental conditions) to be adjusted substantially independently from system output power.

A third fundamental difference and an advantage in the laser system 6000 over that of the conventional Fiber Bragg Grating (FBG) approach shown in FIG. 1 is the ability to decouple the filtering function of the plurality of transmission filters 6400a–6400n from the function of the reflector 6800 which permits the use of many filter architectures and additional design freedoms in component placement and design as is shown hereinafter in the below described embodiments.

Figure 12:
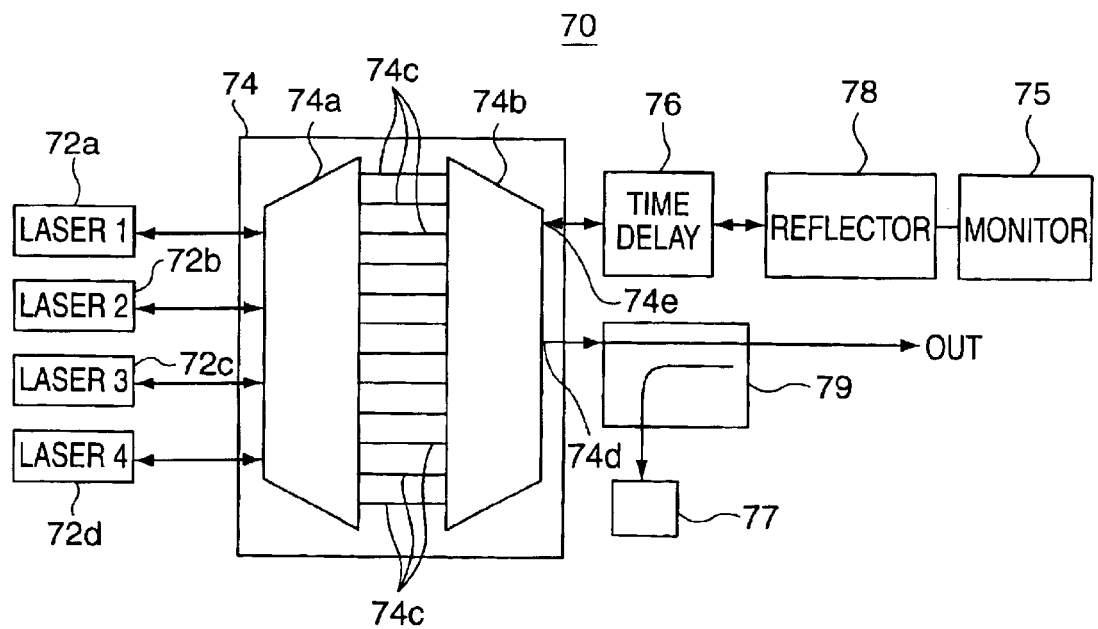
FIG. 12 is a block diagram of an alternative multi-laser system including an array waveguide grating multiplexing transmission filter/multiplexer and a feedback mechanism in a higher diffraction order output of the multiplexing filter in accordance with the second embodiment of the present invention.

Referring now to FIG. 12, there is shown a exemplary implementation of the laser system 7000 of FIG. 10, namely a block diagram of a multi-laser system 70 comprising a single feedback mechanism 76 (TIME DELAY), 78 (REFLECTOR) in a higher diffraction order (m<>0) output 74e of an optical arrayed waveguide grating (AWG) transmission filter/multiplexer 74 that provides stabilizing optical feedback in one of two predetermined polarization states and within a respective one of four predetermined wavelength bands to a respective one of four optical radiation sources 72a–72d in accordance with the second embodiment of the present invention.

The laser system 70 comprises the four optical radiation sources (LASER 1, LASER 2, LASER 3, LASER 4) 72a–72d generating various wavelengths and polarizations, the optical transmission filter/multiplexer 74 that performs multiplexing and demultiplexing in the optical wavelength and/or polarization domains comprising four inputs and a fundamental output 74d and higher diffraction order output 74e, an optional time delay 76, and a reflector 78. The optical radiation sources 72a–72d are coupled to separate inputs of the optical transmission filter/multiplexer 74. The time delay 76 and reflector 78 are serially coupled to the higher-order(m<>0) output 74e of the optical transmission filter/multiplexer 74, and an optional optical tap 79 can be coupled to the fundamental output 74d with an optical monitor 77 being connected to the optional optical tap 79. The radiation sources 72a–72d, optical transmission filter/multiplexer 74, and the delay 76 and reflector 78 are connected together such that polarization is substantially maintained across each connection point of the laser system 70. The output of each of the optical radiation sources 72a–72d is substantially polarized in a respective linear polarization and these polarizations are substantially aligned to one of the principle polarization axes of the respective plurality of transmission filter/multiplexer 74 inputs. No more than two of the stabilized radiation sources 72a–72d may have substantially the same predetermined wavelength band. If two stabilized radiation sources 72a–72d have substantially the same predetermined wavelength band, then the polarizations of the respective optical radiation sources 72a–72d must be substantially aligned to orthogonal principle polarization axes of the respective inputs of the optical transmission filter/multiplexer 74.

The optical radiation sources 72a–72d behave substantially the same as the radiation sources 7200a–7200d of the laser system 7000 of FIG. 10. Each of the four inputs of the transmission filter/multiplexer 74 are designed to pass a respective predetermined wavelength band that falls within the predetermined wavelength range of the respective optical radiation sources 72a–72d, while simultaneously multiplexing these inputs in the optical wavelength and/or polarization domains and transmitting a majority of this filtered, composite signal to the transmission filter/multiplexer 74 zeroth-order (m=0) output 74d. A minor portion of the composite output signal is also passed to a higher diffraction order output (m<>0) 74e of the optical transmission filter/multiplexer 74 and in turn to the optional time delay 76, the reflector 78 and the optional monitor 75. The reflector 78 is arranged to reflect all or a predetermined major first portion of the optionally delayed optical signal from the optional time delay 76 back towards the optional time delay 76 as a respective feedback signal of predetermined polarization and wavelength and transmit none or a predetermined remaining second portion of the optionally delayed optical signal respectively to an optional signal monitor 75 such as an optical detector or spectrum analyzer.

The purpose of the monitor 75 is to allow the measurement of the optical properties of the optical radiation sources 72a–72d so that lifetime and impact on system performance can be continuously updated.

The reflector 78 input and the reflected composite optical signals are substantially the same in optical properties as in, for example, polarization and wavelength. The composite feedback signal then passes again through the optional time delay 76 and into the optical transmission filter/multiplexer 74 where the composite signal is separated by respective wavelength and/or polarization and directed to the respective four inputs of the transmission filter/multiplexer 74. Each of the four inputs of the transmission filter/multiplexer 74 directs only a predetermined band of wavelengths and/or polarization from the incident composite feedback signal to the respective outputs of the four optical radiation sources 72a–72d. The process of feedback and amplification continues in a manner substantially the same as that for the laser system 7000 of FIG. 10 until a steady state output is achieved for the four optical radiation sources 72a–72d, the properties of each of which are substantially determined by the four respective inputs of the transmission filter/multiplexer 74, the optional time delay 76, the reflector 78, and the four respective resonant systems which are formed between the respective high reflectance endfaces of the four optical radiation sources 72a–72d and the reflector 78. The resultant respective feedback substantially determines the output properties (e.g., wavelength, output optical power and stability over time, and environmental conditions) of the four respective optical radiation sources 72a–72d.

The exemplary optical transmission filter/multiplexer 74 shown in FIG. 12 is known in the art as an Array Waveguide Grating (shown within a line rectangle) in the system 70. The AWG 74 comprises a first Free Propagating Region (FPR) 74a, a second FPR 74b, and a plurality of waveguides 74c interconnecting the first and second FPRs 74a and 74b as is well known in the art. Although not shown, each of the plurality of waveguides 74c comprises a different predetermined optical length as is well known in the art (see, for example, H. Takahashiet et al., "Transmission characteristics of arrayed waveguide N×N waveguide multiplexer", J. of Lightwave Technology, Vol. 13, No 3, March 1995, pages 447–455). The predetermined difference in optical lengths of the waveguides 74c imparts respective predetermined relative phase differences to optical signals propagating through the waveguides 74c. The AWG utilizes a combination of these relative phase differences and diffraction to multiplex or demultiplex optical signals. For multiplexing, the multiple input signals from the lasers 72a–72d are positioned on a waveguide slab forming the first FPR 74a in such a way that after propagating through the waveguide slab 74a, and array of waveguides 74c with offset optical lengths (not shown), and a second waveguide slab forming the FPR 74b, a zeroth-order (m=0), diffraction order of all of the multiplexed input signals coincides with the waveguide from the zeroth-order output 74d of the AWG transmission filter/multiplexer 74. Whereas most of the power of the multiplexed input signals from the lasers 72a–72d is found in the zeroth diffraction order, some power resides in non-zero (m<>0, higher diffraction order) diffraction orders (not shown) such as in the −1, +1, −2, +2, . . . −mth, +mth diffraction orders which are offset on either side of the zeroth diffraction order. One property of an AWG transmission filter/multiplexer 74 is that a spacing (d) of the phase shifted array waveguides 74c, and the wavelength and polarization of a channel from the lasers 72a–72d determines the locations of the non-zero diffraction orders. Each non-zero diffraction order experiences an angular dispersion, and higher diffraction orders can more widely separate individual wavelengths than lower orders. The demultiplexing function of the AWG transmission filter/multiplexer 74 is merely a reverse of the multiplexing function described hereinabove. The AWG transmission filter/multiplexer 74 is subject to the same free spectral range requirements as for the transmission filter/multiplexer 7500 of laser system 7000 of FIG. 10.

The laser system 70 shares the same fundamental advantages as described hereinbefore for the laser system 7000 of FIG. 10.

Figure 13:
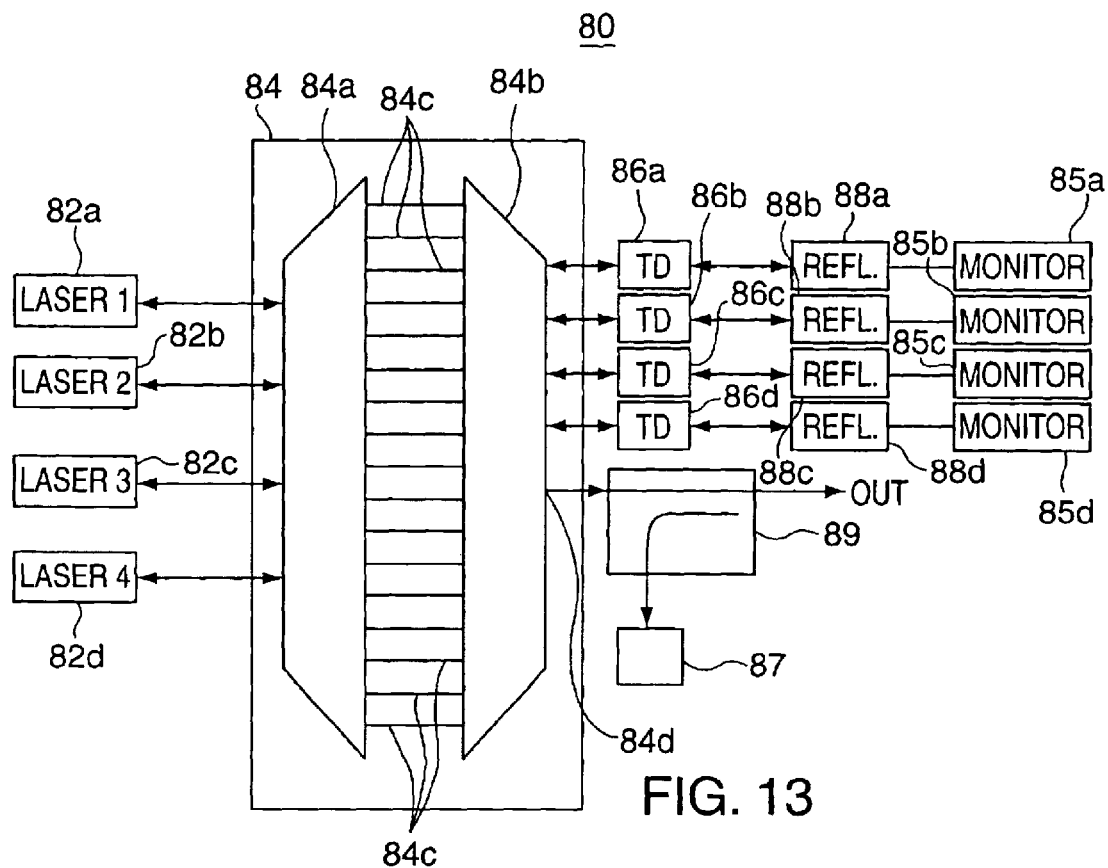
FIG. 13 is a block diagram of an alternative multi-laser system including an array waveguide grating transmission filter/multiplexer and multiple separate feedback mechanisms in respective higher-order output ports of the multiplexing filter in accordance with the concept of the second embodiment of the present invention.

Referring now to FIG. 13, there is shown a modification to the laser system 70 of FIG. 12, namely a block diagram of a multi-laser system 80 comprising multiple separate feedback mechanisms in separate respective higher diffraction order output ports of an optical arrayed waveguide grating (AWG) transmission filter/multiplexer 84 that provide stabilizing optical feedback in one of two predetermined polarization states and within a respective one of four predetermined wavelength bands to a respective one of four optical radiation sources 82a–82d in accordance with the second embodiment of the present invention.

The laser system 80 comprises the four optical radiation sources (LASER 1, LASER 2, LASER 3, LASER 4) 82a–82d generating varying wavelengths and polarizations, the optical transmission filter/multiplexer 84 with four input/outputs and five outputs (four input/outputs and one output) that performs multiplexing and demultiplexing in the optical wavelength and/or polarization domains, a first output in a higher diffraction order corresponding to 82a connected serially to an optional time delay 86a, a reflector 88a, and an optional optical monitor 85a, a second output in the same or different higher diffraction order corresponding to 82b connected serially to an optional time delay 86b, a reflector 88b, and an optional optical monitor 85b, a third output in the same or different higher diffraction order output corresponding to 82c connected serially to an optional time delay 86c, a reflector 88c, and an optional optical monitor 85c, a fourth higher output in the same or different order corresponding to 82d connected serially to an optional time delay 86d, a reflector 88d, and an optional optical monitor 85d, and a fundamental output 84d that is coupled to an optional optical tap 89 that is coupled to a monitor 87. The radiation sources 82a–82d, transmission filter/multiplexer 84, optional time delay 86a–86d, and a reflectors 88a–88d are connected together such that polarization is substantially maintained across each connection point. The output of each of the optical radiation sources 82a–82d is substantially polarized in a respective linear polarization and these polarizations are substantially aligned to one of the principle polarization axes of the respective plurality of input of the optical transmission filter/multiplexer 84. No more than two of the stabilized radiation sources 82a–82d may have substantially the same predetermined wavelength band. If two stabilized radiation sources 82a–82d have substantially the same predetermined wavelength band, then the polarizations of the respective optical radiation sources 82a–82d must be substantially aligned to separate ones of the orthogonal principle polarization axes of the respective inputs of the transmission filter/multiplexer 84.

The optical radiation sources 82a–82d behave substantially the same as the radiation sources 72a–72d of the laser system 70 of FIG. 12. Each of the four inputs of the transmission filter/multiplexer 84 are designed to pass a respective predetermined wavelength band that falls within the predetermined wavelength range of the respective optical radiation sources 82a–82d, while simultaneously multiplexing these inputs in the optical wavelength and/or polarization domains and transmitting a majority of this filtered, composite signal to the zeroth-order output 84d of the transmission filter/multiplexer 84. A minor portion of each of the individual filtered inputs are also passed to individual respective higher diffraction order outputs of the optical transmission filter/multiplexer 84 and, in turn, to respective individual optional time delays 86, respective individual reflectors 88a–88d, and respective individual optional monitors 85a–85d. The respective reflectors 88a–88d are each arranged to reflect all, or a predetermined major first portion, of the respective optionally delayed optical signal from the respective optional time delay 86a–86d back towards the respective optional time delay 86a–86d as a respective feedback signal of predetermined polarization and wavelength, and transmit none or a predetermined remaining respective second portion of the respective optionally delayed optical signal to a respective optional signal monitor 85a–85d such as an optical detector or spectrum analyzer.

The purpose of the monitors 85a–85d is to allow the measurement of the optical properties of the optical radiation sources 82a–82d so that lifetime and impact on system performance can be continuously updated.

The inputs to reflectors 88a–88d and reflected optical feedback signals are substantially the same in optical properties as in, for example, polarization and wavelength. The respective individual feedback signals then pass again through the respective optional time delays 86a–86d and into the optical transmission filter/multiplexer 84 where the signal are routed by respective wavelength and/or polarization and directed to the respective four radiation source inputs of the transmission filter/multiplexer 84. Each of the four inputs of the transmission filter/multiplexer 84 passes only a predetermined band of wavelengths and/or polarization from the incident individual feedback signals to the respective outputs of the four optical radiation sources 82a–82d. The process of feedback and amplification continues in a manner substantially the same as that described hereinbefore for the laser system 70 of FIG. 12 until a steady state output is achieved for the four optical radiation sources 82a–82d, the properties of each of which are substantially determined by the four respective inputs of the transmission filter/multiplexer 84, the four respective individual optional time delays 86a–86d, the four respective individual reflectors 88a–88d, and the four respective resonant systems that are formed between the respective high reflectance endfaces of the four optical radiation sources 82a–82d and the reflectors 88a–88d. The resultant respective feedback substantially determines the output properties (e.g., wavelength, output optical power and stability over time, and environmental conditions) of the four respective optical radiation sources 82a–82d.

The exemplary optical transmission filter/multiplexer 84 shown in FIG. 13 is known in the art as an Array Waveguide Grating (shown within a line rectangle) in the laser system 80. The Array Waveguide Grating transmission filter/multiplexer 84 (comprising the first and second Free Propagating Regions 84a and 84b and interconnecting optical waveguides 84c) functions in the same manner as described hereinbefore for the Array Waveguide Grating transmission filter/multiplexer 74 in the system 70 of FIG. 12, with the exception that the grating and the device is designed to utilize sufficiently high diffraction orders (m<>0) for feedback such that the higher diffraction order angular dispersion characteristics of the grating are relatively large, and different wavelength passbands and/or polarizations are not co-linearly positioned (i.e., are accessible via different outputs) in the grating while a zeroth diffraction order (m=0) output 84d from the multiplexing transmission filter 84 provides the output from the system 80. In the AWG 74 of system 70, the different wavelength bands and/or polarizations are co-linearly positioned. The AWG transmission filter/multiplexer 84 is subject to the same free spectral range requirements as described hereinbefore for the transmission filter/multiplexer 7500 of laser system 7000 of FIG. 10.

The laser system 80 shares the same fundamental advantages as described hereinbefore for the laser system 7000 of FIG. 10.

A fundamental difference and an advantage of the laser system 80 over that of the laser system 7000 of FIG. 10 is that the amount of respective optical reflective feedback is individually adjustable for each respective laser 82a–82d, allowing laser properties influenced by feedback (e.g., wavelength, output optical power and stability over time and environmental conditions) to be adjusted and hence optimized independently of each other.

Figure 14:
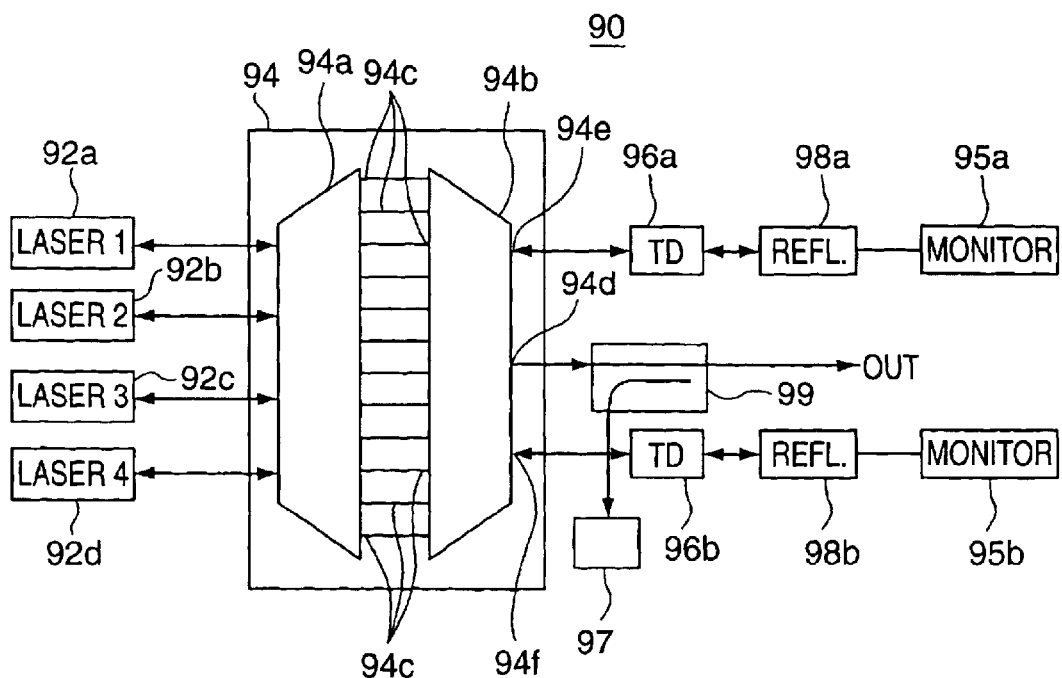
FIG. 14 is a block diagram of an alternative multi-laser system including an array waveguide grating multiplexing transmission filter and multiple composite feedback mechanisms in higher-order outputs of the multiplexing filter in accordance with the concept of the second embodiment of the present invention.

Referring now to FIG. 14, there is shown a modification to the laser system 70 of FIG. 12, namely a block diagram of a multi-laser system 90 comprising multiple composite feedback mechanisms 96a–96b, and 98a–98b) in higher diffraction order (m<>0) outputs of an optical arrayed waveguide grating (AWG) transmission filter/multiplexer 94 that provide stabilizing optical feedback in one of two predetermined polarization states and within a respective one of four predetermined wavelength bands to a respective one of four optical radiation sources (LASER 1, LASER 2, LASER 3, LASER 4) 92a–92d in accordance with the second embodiment of the present invention.

The laser system 90 comprises the four optical radiation sources 92a–92d generating various wavelengths and polarizations, the optical transmission filter/multiplexer 94 that performs multiplexing and demultiplexing in the optical wavelength and/or polarization domains comprising (a) four input/outputs connected to respective ones of the four optical radiation sources 92a–92d, (b) three outputs comprising a first composite higher diffraction order output 94e, which is also an input/output connected serially to an optional time delay 96a, a reflector 98a, and an optional optical monitor 95a, a second composite higher diffraction order output 94f, which is also an input/output connected serially to an optional time delay 96b, a reflector 98b, and an optional optical monitor 95b, and a composite fundamental output 94d to which is coupled an optional optical tap 99 that has a monitor 97 coupled thereto. The optical radiation sources 92a–92d, optical transmission filter/multiplexer 94, optional time delays 96 and 96b, and reflectors 98a and 98b are connected together such that polarization is substantially maintained across each connection point. The output of each of the optical radiation sources 92a–92d is substantially polarized in a respective linear polarization and these polarizations are substantially aligned to one of the principle polarization axes of the plurality of respective inputs of the transmission filter/multiplexer 94. No more than two of the stabilized radiation sources 92a–92d may have substantially the same predetermined wavelength band. If two stabilized radiation sources 92a–92d have substantially the same predetermined wavelength band then the polarizations of the respective optical radiation sources 92a–92d must be substantially aligned to orthogonal principle polarization axes of the respective inputs of the transmission filter/multiplexer 94.

The optical radiation sources 92a–92d behave substantially the same as described hereinbefore for the radiation sources 7200a–7200n of the laser system 7000 of FIG. 10. Each of the four transmission filter/multiplexer 94 inputs are designed to pass a respective predetermined wavelength band that falls within the predetermined wavelength range of the respective optical radiation sources 92a–92d, while simultaneously multiplexing these inputs in the optical wavelength and/or polarization domains and transmitting a majority of this filtered, composite signal to the zeroth-order output 94d of the transmission filter/multiplexer 94. A first minor portion of the multiplexed filtered inputs is also directed to the composite higher diffraction order output 94e of the optical transmission filter/multiplexer 94 and in turn to the optional time delay 96a, the reflector 98a, and the optional monitor 95a. A second minor portion of the multiplexed filtered inputs is also directed to the composite higher diffraction order output 94f of the optical transmission filter/multiplexer 94 and, in turn, to the optional time delay 96b, the reflector 98b, and the optional monitor 95b. The respective reflectors 98a and 98b are each arranged to reflect all or a predetermined major first portion of the respective optionally delayed optical signal from the respective optional time delays 96a and 96b back towards the respective optional time delays 96a and 96b as a respective feedback signal of predetermined polarization and wavelength and transmit none or a predetermined remaining respective second portion of the respective optionally delayed optical signals to respective optional signal monitors 95a and 95b such as an optical detector or spectrum analyzer.

The purpose of the monitors 95a and 95b is to allow the measurement of the optical properties of the optical radiation sources 92a–92d so that lifetime and impact on system performance can be continuously updated.

The inputs to the reflectors 98a and 98b, and the reflected composite optical signals are substantially the same in optical properties as in, for example, polarization and wavelength. The respective individual feedback signals then pass again through the respective optional time delays 96a and 96b and into the optical transmission filter/multiplexer 94 where the signal are routed by respective wavelength and/or polarization and directed to the respective four inputs of the transmission filter/multiplexer 94. Each of the four inputs of transmission filter/multiplexer 94 inputs directs only a predetermined band of wavelengths and/or polarization from the incident individual feedback signals to the respective outputs of the four optical radiation sources 92a–92d. The process of feedback and amplification continues in a manner substantially the same as that described hereinbefore for the laser system 7000 of FIG. 10, until a steady state output is achieved for the four optical radiation sources 92a–92d, the properties of each of the radiation sources 92a–92d being substantially determined by the four respective inputs of the transmission filter/multiplexer 94, the two respective individual optional time delays 96a and 96b, the two respective individual reflectors 98a and 98b, and the two respective resonant systems which are formed between the respective high reflectance endfaces of the four optical radiation sources 92a–92d and the reflectors 98a and 98b. The resultant respective feedback substantially determines the output properties (e.g., wavelength, output optical power and stability over time, and environmental conditions) of the four respective optical radiation sources 92a–92d.

The exemplary optical transmission filter/multiplexer 94 shown in FIG. 14 is known in the art as an Array Waveguide Grating (shown within a dashed line rectangle) in the laser system 90. The Array Waveguide Grating transmission filter/multiplexer 94 (comprising the first and second Free Propagating Regions 94a and 94b and interconnecting optical waveguides 94c) functions in the same manner as described hereinbefore for the Array Waveguide Grating transmission filter/multiplexer 74 in the system 70 of FIG. 12 with the exception that the system 90 uses two composite higher diffraction orders (m<>0) on opposite sides of the fundamental diffraction order (m=0) output 94d for feedback while the zeroth-order output 94d from the multiplexing transmission filter transmission filter 94 provides the output from the system 90. The AWG transmission filter/multiplexer 94 is subject to the same free spectral range requirements as described hereinbefore for the transmission filter/multiplexer 7500 of laser system 7000 of FIG. 10.

The laser system 90 shares the same fundamental advantages as described hereinbefore for the laser system 7000 of FIG. 10.

Laser system 90 is an improvement over the concept of laser system 70 of FIG. 12 where feedback is taken from only one of the non-zero diffraction orders (e.g., m=+1) of the multiplexing transmission filter 74. If the inherent power in the one non-zero order is not sufficient for feedback, the transmission filter/multiplexer can be designed such that additional power is diffracted to that particular diffraction order which has the negative impact of decreasing the output power of the system 90 from the fundamental output 94d. However, in the multi-laser system 90, more than one of the non-zero diffraction orders (e.g., m=+1 and m=−1) of the multiplexing transmission filter transmission filter 94 are utilized simultaneously. This approach utilizes the additional inherent power in multiple diffraction orders and reduces or essentially eliminates the need to direct additional power to the higher diffraction order used in the multi-laser system 70. This allows less overall loss in the system 90 and a higher power at the zeroth-order output 94d.

Figure 15:
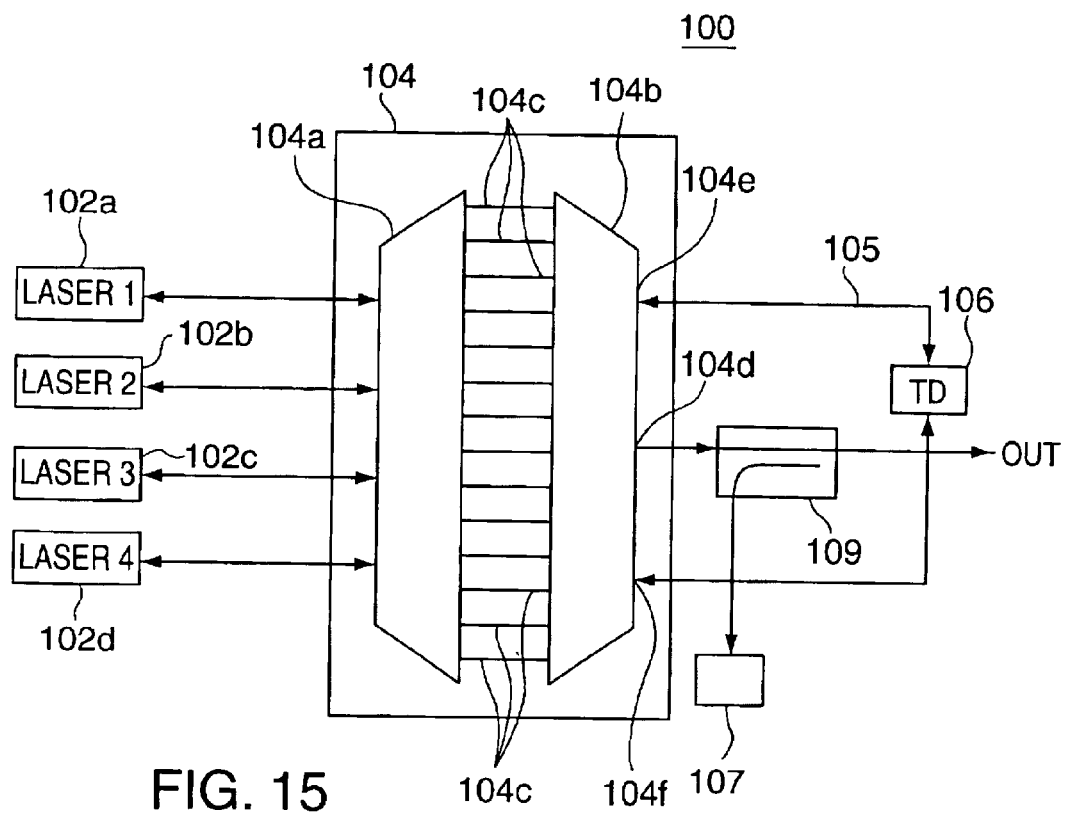
FIG. 15 is a block diagram of an alternative multi-laser system including an array waveguide grating multiplexing transmission filter and a feedback loop between predetermined higher diffraction order outputs of the multiplexing filter in accordance with the concept of the second embodiment of the present invention.

Referring now to FIG. 15, there is shown a modification to the laser system 70 of FIG. 12, namely a block diagram of a multi-laser system 100 comprising a composite feedback mechanism (loop 105, TD 106) interconnecting higher diffraction order (m<>0) outputs (104e, 104f) of an optical arrayed waveguide grating (AWG) transmission filter/multiplexer 104 that provide stabilizing optical feedback in one of two predetermined polarization states and within a respective one of four predetermined wavelength bands to a respective one of four optical radiation sources (LASER 1, LASER 2, LASER 3, LASER 4) 102a–102d in accordance with the second embodiment of the present invention.

The laser system 100 comprises the four optical radiation sources 102a–102d generating various wavelengths and polarizations, the optical transmission filter/multiplexer 104 that performs multiplexing and demultiplexing in the optical wavelength and/or polarization domains and comprises four input/outputs and three outputs (output 104d, input/outputs 104e and 104f), a first composite higher diffraction order (m=+X, x<>0) input/output 104e which is connected serially to an optional time delay 106 and a second composite opposite higher diffraction order (m=−X, x<>0) output 104f via a waveguide feedback loop 105, and a composite zeroth-order output 104d which is coupled to an optional optical tap 109 to which a monitor 107 is coupled. The optical radiation sources 102a–102d, optical transmission filter/multiplexer 104, and the waveguide feedback loop 105 are connected together such that polarization is substantially maintained across each connection point. The output of each of the optical radiation sources 102a–102d is substantially polarized in a respective linear polarization and these polarizations are substantially aligned to one of the principle polarization axes of the respective plurality of inputs of the transmission filter/multiplexer 104. No more than two of the stabilized radiation sources 102a–102d may have substantially the same predetermined wavelength band. If two stabilized radiation sources 102a–102d have substantially the same predetermined wavelength band, then the polarizations of the respective optical radiation sources 102a–102d must be substantially aligned to orthogonal principle polarization axes of the respective inputs of the transmission filter/multiplexer 104.

The optical radiation sources 102a–102d behave substantially the same as described hereinbefore for the radiation sources 7200a–7200n of the laser system 7000 of FIG. 10. Each of the four inputs of the transmission filter/multiplexer 104 are designed to pass a respective predetermined wavelength band that falls within the predetermined wavelength range of the respective optical radiation sources 102a–102d, while simultaneously multiplexing these inputs in the optical wavelength and/or polarization domains and transmitting a majority of this filtered and composite signal to the zeroth-order output 104d of the transmission filter/multiplexer 104. A first minor portion of the multiplexed filtered inputs is also input from the second free propagation region 104b to the composite higher diffraction order (m=+x, x<>0) port 104e of the optical transmission filter/multiplexer 104 and, in turn, passes through the optional time delay 106 and is then output from the opposite higher diffraction order port 104f back into the second free propagation region 104b where it is, in turn. directed to the respective four inputs of the transmission filter/multiplexer 104. A second minor portion of the multiplexed filtered inputs is also input from the second free propagation region 104b to the composite higher diffraction order (m=−x, x<>0) port 104f of the optical transmission filter/multiplexer 104 and, in turn, to the optional time delay 106 and then output from the opposite higher diffraction order port 104e back into the second free propagation region 104b where it is, in turn, directed to the respective four inputs of the transmission filter/multiplexer 104. The outputs from the higher diffraction order ports 104e and 104f propagating back into the second free propagation region 104b constitute respective feedback signals of predetermined polarization and wavelength. The input and output optical signals from the higher diffraction order ports 104e and 104f of the transmission filter/multiplexer 104 are substantially the same in optical properties as in, for example, polarization and wavelength. Each of the four transmission filter/multiplexer 104 inputs directs only a predetermined band of wavelengths and/or polarization from the incident composite feedback signals to the respective outputs of the four optical radiation sources 102a–102d. The process of feedback and amplification continues in a manner substantially the same as that described hereinbefore for the laser system 7000 of FIG. 10 until a steady state output is achieved for the four optical radiation sources 102a–102d, the properties of each of which are substantially determined by the four respective transmission filter/multiplexer 104 inputs, the optional time delays 106, the connecting waveguide loop 105, and the four respective resonant systems which are formed between the respective high reflectance endfaces of the four optical radiation sources 102a–102d and the connecting waveguide loop 105. The resultant respective feedback substantially determines the output properties (e.g., wavelength, output optical power and stability over time, and environmental conditions) of the four respective optical radiation sources 102a–102d.

The exemplary optical transmission filter/multiplexer 104 shown in FIG. 15 is known in the art as an Array Waveguide Grating (shown within a line rectangle) in the laser system 100. The Array Waveguide Grating transmission filter/multiplexer 104 comprises the first and second Free Propagating Regions 104a and 104b and interconnecting optical waveguides 104c, and functions in the same manner as that described hereinbefore for the Array Waveguide Grating transmission filter/multiplexer 74 described in the system 70 of FIG. 12 with the exception that the system 100 uses the interconnection of waveguide loop 105 to two opposite composite higher diffraction orders (m=+X, m=−X, X not= 0) 104e and 104f for feedback while a zeroth diffraction order (m=0) output 104d from the multiplexing transmission filter 104 provides the output from the system 100. The AWG transmission filter/multiplexer 104 is subject to the same free spectral range requirements as described hereinbefore for the transmission filter/multiplexer 7500 of laser system 7000 of FIG. 10.

The laser system 100 shares the same fundamental advantages as described hereinbefore for the laser systems 7000 and 90 of FIGS. 10 and FIG. 14, respectively.

An advantage of the system 100 over that of the previously described systems 3000, 4000, 5000, 6000, 7000, 30, 40, 50, 60, 70, 80, and 90 is that a reflector is not required. Instead, the non-zero higher diffraction order port (m=+X) 104e or 104f of the transmission filter/multiplexer 104 is coupled directly back to the transmission filter/multiplexer 104 through another non-zero higher diffraction order port (m=−X) 104f or 104e. The advantage of this approach includes elimination of a reflector and improved process tolerance since the paths of the waveguide feedback loop 105 are perfectly symmetrical by design. The system 100 is effectively supplying a feedback signal to the lasers 102a–102d, but there is no physical reflector involved. The same approach is possible with all of the non-zero diffraction orders: m=1 connected to m=−1, m=1 connected to m=2, etc. of the AWG transmission filter/multiplexer 104.

Figure 16:
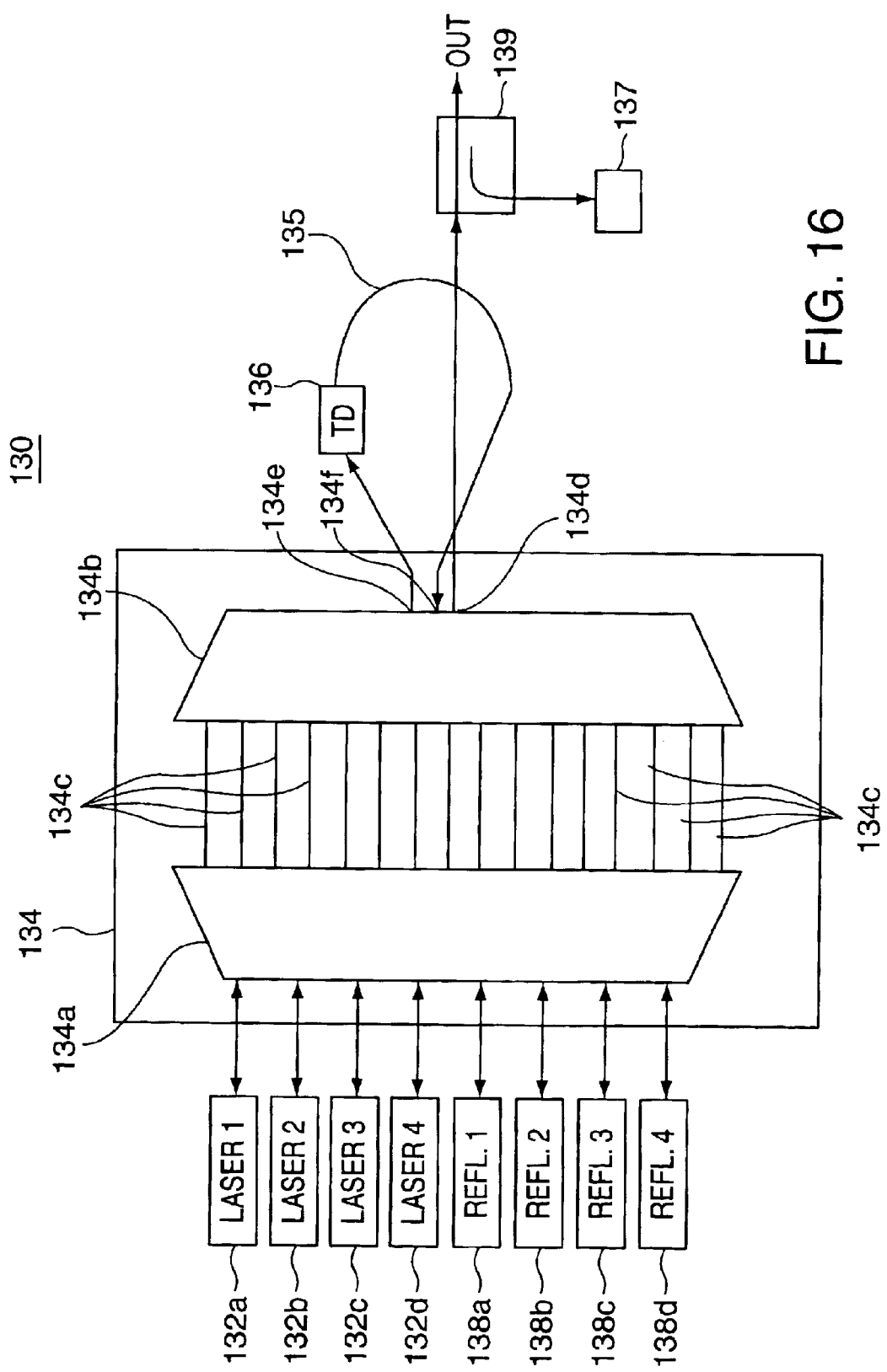
FIG. 16 is a block diagram of a multi-laser system comprising a Arrayed Waveguide grating multiplexing transmission filter and separate feedback mechanisms comprising a loop between higher diffraction order output of the multiplexing filter corresponding to radiation sources and a diffraction order corresponding to separate reflectors in accordance with the second embodiment of the present invention.

Referring now to FIG. 16, there is shown a modification to the laser system 80 of FIG. 13, namely a block diagram of a multi-laser system 130 comprising an Array Waveguide Grating (AWG) transmission filter/multiplexer 134, separate feedback mechanisms comprising a connection via a waveguide loop 135 between a higher diffraction order output port 134e (corresponding to the separate lasers 132a–132d) and either a zeroth-order (m=0) or a diffraction order (m<>0) output port 134f (corresponding to the separate reflectors 138a–138d) that provides a stabilizing optical feedback in one of two predetermined polarization states, and within a respective one of four predetermined wavelength bands, to a respective one of four optical radiation sources 132a–132d in accordance with the second embodiment of the present invention.

The laser system 130 comprises the four optical radiation sources 132a–132d generating various wavelengths and polarizations, the optical transmission filter/multiplexer 134 that performs multiplexing and demultiplexing in the optical wavelength and/or polarization domains comprising (a) a first free propagation region (FPR) 134a comprising eight ports separately coupled to the four optical radiation sources 132a–132d and to four reflectors (REFL1–REFL4) 138a–138d, and (b) a second FPR 134b comprising three ports 134d, 134e, and 134f where the first composite higher diffraction order (m<>0) port 134e is connected serially to an optional time delay 136 and to a second zeroth-order (m2=0) or higher diffraction order (m2<>0) output 134f via a waveguide loop 135, and a zeroth-order (m=0) output 134d to which an optional optical tap 139 is coupled with a monitor 137 coupled to the optical tap 139. The optical radiation sources 132a–132d, the four reflectors 138a–138d, the optical transmission filter/multiplexer 134, and the waveguide loop 135 are connected together such that polarization is substantially maintained across each connection point. The output of each of the optical radiation sources 132a–132d is substantially polarized in a respective linear polarization and these polarizations are substantially aligned to one of the principle polarization axes of the respective plurality of inputs of the transmission filter/multiplexer 134. No more than two inputs of the transmission filter/multiplexer 134 may have substantially the same predetermined wavelength band. If two inputs of the transmission filter/multiplexer 134 have substantially the same predetermined wavelength band, then the polarizations of the respective optical radiation sources 132a–132d must be substantially aligned to orthogonal principle polarization axes of the respective inputs of the transmission filter/multiplexer 134. The diffraction orders m corresponding to the path through the transmission filter/multiplexer 134 between the lasers 132a–132d and the ports 134e and 134d are different from the diffraction orders m2 corresponding to the path through the transmission filter/multiplexer 134 between the port 134f and the reflectors 138a–138d, where m2 is an integer. This is achieved by the proper choice of the relative positions of the lasers 132a–132d and the reflectors 138a–138d in the first FPR 134a, and by the relative positions of the ports 134e and 134f in the second FPR 134b.

The optical radiation sources 132a–132d behave substantially the same as that described hereinbefore for the radiation sources 82a–82d of the laser system 80 of FIG. 13. Each of the four inputs of the transmission filter/multiplexer 134 of the first FPR 134a are designed to pass a respective predetermined wavelength band that falls within the predetermined wavelength range of the respective optical radiation sources 132a–132d, while simultaneously multiplexing these inputs in the optical wavelength and/or polarization domains, and transmitting a majority of this filtered and composite signal to the zeroth-order (m=0) output 134d of the transmission filter/multiplexer 134. A minor portion of the multiplexed filtered inputs is also input from the free propagation region 134b to the composite higher diffraction order (m<>0) port 134e of the optical transmission filter/multiplexer 134 and, in turn, to the optional time delay 136 and then output from the zeroth-order (m=0) or higher diffraction order (m<>0) port 134f back into the free propagation region 134b where it is, in turn, demultiplexed and directed to the respective four outputs of the first FPR 134a which are coupled to the respective reflectors 138a–138d. The reflector 138a–138d input and reflected optical signals are substantially the same in optical properties as in, for example, polarization and wavelength. Each of the respective reflectors 138a–138d are designed to reflect a major portion of the respective incident predetermined wavelength band back into the first FPR 134a of the transmission/filter multiplexer 134 where it is multiplexed with the other reflected predetermined wavelength bands. This multiplexed signal is input to port 134f of the second FPR 134b, in turn, passing to the optional time delay 136 and back in to the transmission filter/multiplexer 134 via port 134e where it is demultiplexed again and directed to each of the respective lasers 132a–132d. The output from the higher diffraction order (m<>0) port 134e back into the free propagation region 134b constitutes respective feedback signals of predetermined polarization and wavelength. The zeroth-order (m=0) or higher diffraction order port (m2<>0) 134f cannot correspond to a fundamental or higher diffraction order of the transmission filter/multiplexer 134 relative to the input lasers 132a–132d. Instead, the port (m2<>0) 134f must correspond to a fundamental or higher diffraction order of the transmission filter/multiplexer 134 relative to the output reflectors 138a–138d so that an optical path is established between the lasers 132a–132d and the respective reflectors 138a–138d. The higher diffraction order ports 134e and 134f input and output optical signals, and the reflector 138a–138d incident and reflected signals are substantially the same in optical properties as in, for example, polarization and wavelength. Each of the four inputs of the transmission filter/multiplexer 134 directs only a predetermined band of wavelengths and/or polarization from the incident individual feedback signals to the respective outputs of the four optical radiation sources 132a–132d. The process of feedback and amplification continues in a manner substantially the same as that described hereinbefore for laser system 80 of FIG. 13 until a steady state output is achieved for the four optical radiation sources 132a–132d, the properties of each of which being substantially determined by the four respective inputs of the transmission filter/multiplexer 134, the optional time delay 136, the four respective individual reflectors 138a–138d, the higher diffraction order (m<>0) port 134e, the zeroth-order (m=0) or higher diffraction order (m2<>0) port 134f, and the four respective resonant systems which are formed between the respective high reflectance endfaces of the four optical radiation sources 132a–132d and the respective reflectors 138a–138d. In general it is desirable to use the zeroth-order (m2=0) of the transmission filter/multiplexer 134 connecting port 134f and the reflectors 138a–138d since this will result in the lowest loss between these points and hence the highest effective feedback.

The advantage of the laser system 130 over that of the laser system 80 is that since the feedback from the reflectors 138a–138d in the laser system 130 makes two passes through the transmission filter/multiplexer 134 in getting to the lasers 132a–132d, the desirable filtering properties of the transmission filter/multiplexer 134 are effectively enhanced by a factor of two.

Figure 17:
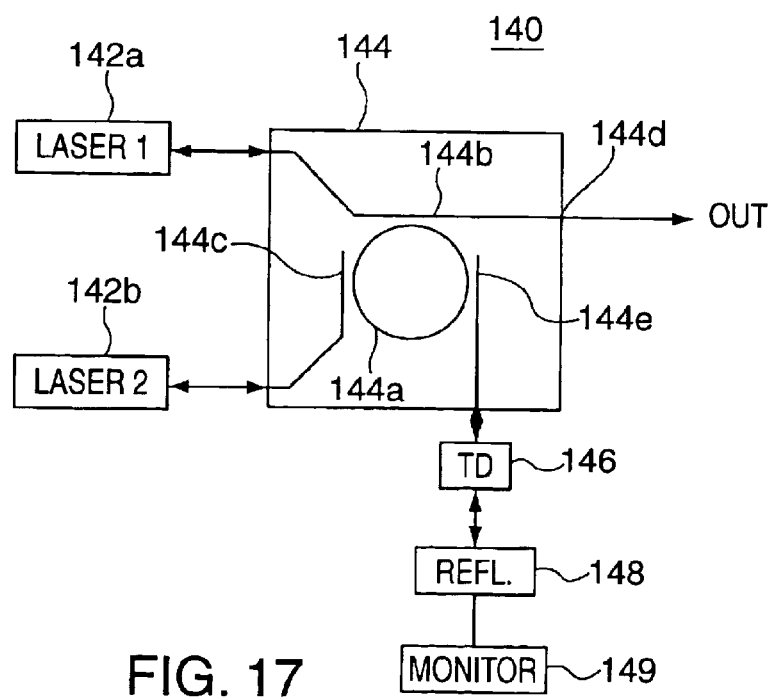
FIG. 17 is a block diagram of an alternative multi-laser system including a ring resonator multiplexing transmission filter and a feedback mechanism in a secondary output of the multiplexing filter in accordance with the concept of the second embodiment of the present invention.

Referring now to FIG. 17, there is shown an exemplary implementation of the laser system 7000 of FIG. 10, namely a block diagram of a multi-laser system 140 including a single feedback mechanism 146 and 148 in a secondary output of an optical transmission filter/multiplexer 144 that provides stabilizing optical feedback in one of two predetermined polarization states, and within a respective one of two predetermined wavelength bands to a respective one of two optical radiation sources (LASER 1, LASER 2) 142a and 142b in accordance with the second embodiment of the present invention.

The laser system 140 comprises the two optical radiation sources 142a and 142b generating various wavelengths and polarizations, the optical transmission filter/multiplexer 144 with two input/outputs and two or more outputs which performs multiplexing and demultiplexing in the optical wavelength and/or polarization domains, a secondary output 144e, an optional time delay 146, a reflector 148, an optional monitor 149, and a primary output 144d. The optical radiation sources 142a and 142b are coupled to separate inputs of the optical transmission filter/multiplexer 144, the optional time delay 146, reflector 148, and optional monitor 149 are serially coupled to the secondary output 144e, and the primary output 144d provides the output of the laser system 140. The optical radiation sources 142a and 142b. optical transmission filter/multiplexer 144, the optional time delay 146, the reflector 148, and the optional monitor 149 are connected together such that polarization is substantially maintained across each connection point. The output of each of the optical radiation sources 142a and 142b is substantially polarized in a respective linear polarization, and these polarizations are substantially aligned to one of the principle polarization axes of the two respective transmission filter/multiplexer inputs 144b and 144c. If the two stabilized radiation sources 142a and 142b have substantially the same predetermined wavelength band then the polarizations of the respective optical radiation sources 142a and 142b must be substantially aligned to orthogonal principle polarization axes of the respective inputs of the transmission filter/multiplexer 144.

The optical radiation sources 142a and 142b behave substantially the same as the radiation sources 7200a–7200n of the laser system 7000 of FIG. 10. Each of the two inputs 144b and 144c of the transmission filter/multiplexer 144 are designed to pass a major portion of a respective predetermined wavelength band that falls within the predetermined wavelength range of the respective optical radiation sources 142a and 142b to the primary output 144d of the optical transmission filter/multiplexer 144, while simultaneously multiplexing these inputs in the optical wavelength and/or polarization domains, and transmitting this filtered and composite signal to the primary output 144d of the transmission filter/multiplexer 144 as an output of the laser system 140. A minor portion of the composite filtered output signal is also passed to the secondary output 144e of the transmission filter/multiplexer 144 and, in turn, to the optional time delay 146, the reflector 148 and the optional monitor 149. The reflector 148 is arranged to reflect all or a predetermined major first portion of the optionally delayed optical signal from the optional delay 146 back towards the optional delay 146 as a respective feedback signal of predetermined polarizations and wavelengths, and transmit none or a predetermined remaining second portion of the optionally delayed composite optical signal to the optional signal monitor 149. The input and reflected composite optical signals of the reflector 148 are substantially the same in optical properties as in, for example, polarization and wavelength. The composite feedback signal then passes again through the optional time delay 146 and into the optical transmission filter/multiplexer 144 via path 144e where the composite signal is separated by respective wavelength and/or polarization and directed to the respective two transmission filter/multiplexer 144 inputs. Each of the two transmission filter/multiplexer 144 inputs 144b and 144c passes only a predetermined band of wavelengths and/or polarization from the incident composite signal to the respective outputs of the two optical radiation sources 142a and 142b. The process of feedback and amplification continues in a manner substantially the same as that described hereinbefore for the laser system 7000 of FIG. 10 until a steady state output is achieved for the two optical radiation sources 142a and 142b, the properties of each of which are substantially determined by the two respective inputs of the transmission filter/multiplexer 144, the optional time delay 146, the reflector 148, and the two respective resonant systems which are formed between the respective high reflectance endfaces of the two optical radiation sources 142a and 142b and the reflector 148. The resultant respective feedback substantially determines the output properties (e.g., wavelength, output optical power and stability over time, and environmental conditions) of the two respective optical radiation sources 142a and 142b.

The exemplary optical transmission filter/multiplexer 144 shown in FIG. 17 is known in the art as a ring resonator (shown within a line rectangle) in the system 140. The operation of this ring resonator 144 is substantially the same as the ring resonator 64a in the system 60 of FIG. 7. In the ring resonator 144, each of the optical signals from the lasers 142a and 142b are coupled into a ring 144a where they are filtered and multiplexed as is well know in the art. More particularly, filtering is produced by coupling part of each of the input optical signals into the ring 144a for propagation therein. For example, when part of the optical signal from laser 142a is coupled into the ring 144a from path 144b it propagates around the ring 144a. When part of this propagated signal couples back to the path 144b, certain predetermined wavelengths interfere constructively with those in path 144b while other predetermined wavelengths interfere destructively with those in path 144b. The wavelengths that are constructively interfered with in path 144b are enhanced while those that are destructively interfered with in the path 144b are suppressed. From the output of path 144b the signals pass straight through to the primary output 144d of the ring resonator 144, and also to the input of the optional time delay time delay 146 or directly to the reflector 148 via the ring 144a. A similar operation occurs with the optical signal from the laser 142b. There, the optical signal in path 144c experiences constructive or destructive interference for predetermined wavelengths with a part of the signal that has already propagated around the ring 144a from laser 142b. The wavelengths that are constructively and destructively interfered with are dependent on the optical length of the ring 144a as is well know in the art. The wavelengths that were not destructively interfered with continue propagating in the ring 144a and are coupled into the path 144b and out to the optional time delay time delay 146, or directly to the reflector 148 as a multiplexed output optical signal from the lasers 142a and 142b. A similar operation occurs with the path 144e which is arranged in position and properties such that a relatively small amount of signal is coupled into path 144e relative to that coupled into path 144b which, in turn, is connected to the primary output 144d of the system 140.

The laser system 140 shares the first, third and fourth fundamental advantages described hereinbefore for the laser system 7000 of FIG. 10.

Figure 18:
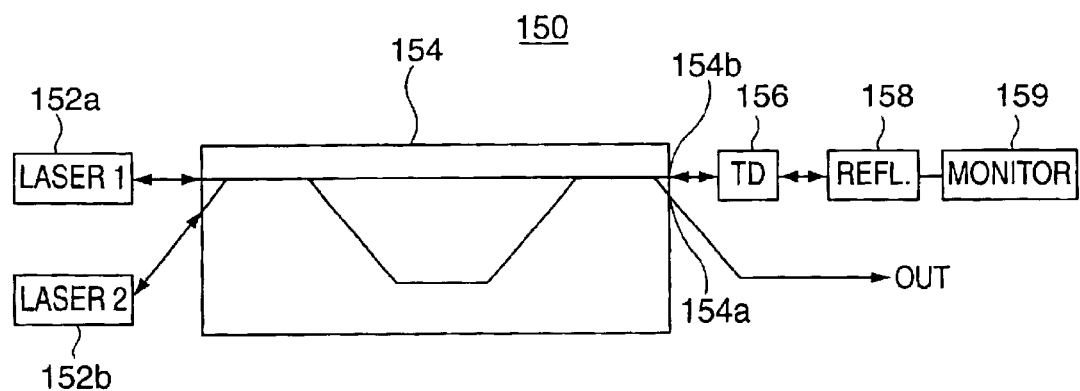
FIG. 18 is a block diagram of an alternative multi-laser system including a symmetric Mach Zehnder multiplexing transmission filter and a feedback mechanism in a secondary output of the multiplexing filter in accordance with the concept of the second embodiment of the present invention.

Referring now to FIG. 18, there is shown an exemplary implementation of the laser system 7000 of FIG. 10, namely a block diagram of a multi-laser system 150 comprising a single feedback mechanism 156 (TD, Time Delay), 158 (REFL., Reflector) in a secondary output 154b of an optical transmission filter/multiplexer 154 which provides stabilizing optical feedback in one of two predetermined polarization states and within a respective one of two predetermined wavelength bands to a respective one of two optical radiation sources (LASER 1, LASER 2) 152a and 152b in accordance with the second embodiment of the present invention.

The laser system 150 comprises the two optical radiation sources 152a and 152b generating various wavelengths and polarizations, the optical transmission filter/multiplexer 154 that performs multiplexing and demultiplexing in the optical wavelength and/or polarization domains and comprises two input/outputs coupled to the two optical radiation sources 152a and 152b, a primary output 154a, and a secondary output/input 154b that is serially coupled to an optional time delay 156, a reflector 158, and an optional monitor 159. The optical radiation sources 152a and 152b, optical transmission filter/multiplexer 154, optional time delay 156, and reflector 158 are connected together such that polarization is substantially maintained across each connection point. The output of each of the optical radiation sources 152a and 152b is substantially polarized in a respective linear polarization, and these polarizations are substantially aligned to one of the principle polarization axes of the two respective inputs of the transmission filter/multiplexer 154 inputs. If the two stabilized radiation sources 152a and 152b have substantially the same predetermined wavelength band then the polarizations of the respective optical radiation sources 152a and 152b must be substantially aligned to orthogonal principle polarization axes of the respective transmission filter/multiplexer 154.

The optical radiation sources 152a and 152b behave substantially the same as described hereinbefore for the radiation sources 7200a–7200n of the laser system 7000 of FIG. 10. Each of the two transmission filter/multiplexer 154 inputs are designed to pass a major portion of a respective predetermined wavelength band that falls within the predetermined wavelength range of the respective optical radiation sources 152a and 152b to the primary output 154a of the optical transmission filter/multiplexer 154, while simultaneously multiplexing these inputs in the optical wavelength and/or polarization domains, and transmitting this filtered and composite signal to the fundamental output 154a of the transmission filter/multiplexer 154 as an output of the laser system 150. A minor portion of the composite filtered output signal is also passed to the secondary output 154b of the transmission filter/multiplexer 154 and, in turn, to the optional time delay 156, the reflector 158, and the optional monitor 159. The reflector 158 is arranged to reflect all or a predetermined major first portion of the optionally delayed optical signal from the optional delay 156 back towards the optional delay 156 as a respective feedback signal of predetermined polarizations and wavelengths, and transmit none or a predetermined remaining second portion of the optionally delayed composite optical signal to the optional signal monitor 159. The input and reflected composite optical signals of the reflector 158 are substantially the same in optical properties as in, for example, polarization and wavelength. The composite feedback signal then passes again through the optional time delay 156 and into the optical transmission filter/multiplexer 154 via secondary port 154b where the composite signal is separated by respective wavelength and/or polarization and directed to the respective two inputs of the transmission filter/multiplexer 154. Each of the two inputs of the transmission filter/multiplexer 154 passes only a predetermined band of wavelengths and/or polarization from the incident composite signal to the respective outputs of the two optical radiation sources 152a and 152b. The process of feedback and amplification continues in a manner substantially the same as that described hereinbefore for the laser system 7000 of FIG. 10 until a steady state output is achieved for the two optical radiation sources 152a and 152b, the properties of each of which are substantially determined by the two respective inputs of the transmission filter/multiplexer 154, the optional time delay 156, the reflector 158, and the two respective resonant systems which are formed between the respective high reflectance endfaces of the two optical radiation sources 152a and 152b, and the reflector 158. The resultant respective feedback substantially determines the output properties (e.g., wavelength, output optical power and stability over time, and environmental conditions) of the two respective optical radiation sources 152a and 152b.

The exemplary optical transmission filter/multiplexer 154 shown in FIG. 18 is known in the art as an Asymmetric Mach Zehnder Interferometer (AMZI, shown within a line rectangle) in the system 150 and is well known in the art. Using simple two-beam interference in an unbalanced interferometer, the AMZI 154 multiplexes the output signals of various wavelength and polarizations from the lasers 152a and 152b into a composite output signal of predetermined wavelengths and polarizations, or demultiplexes a composite input signal of predetermined wavelengths and polarizations into individual outputs of predetermined wavelengths and polarizations.

The laser system 150 shares the first, third and fourth fundamental advantages described hereinbefore for the laser system 7000 of FIG. 10.

Figure 19:
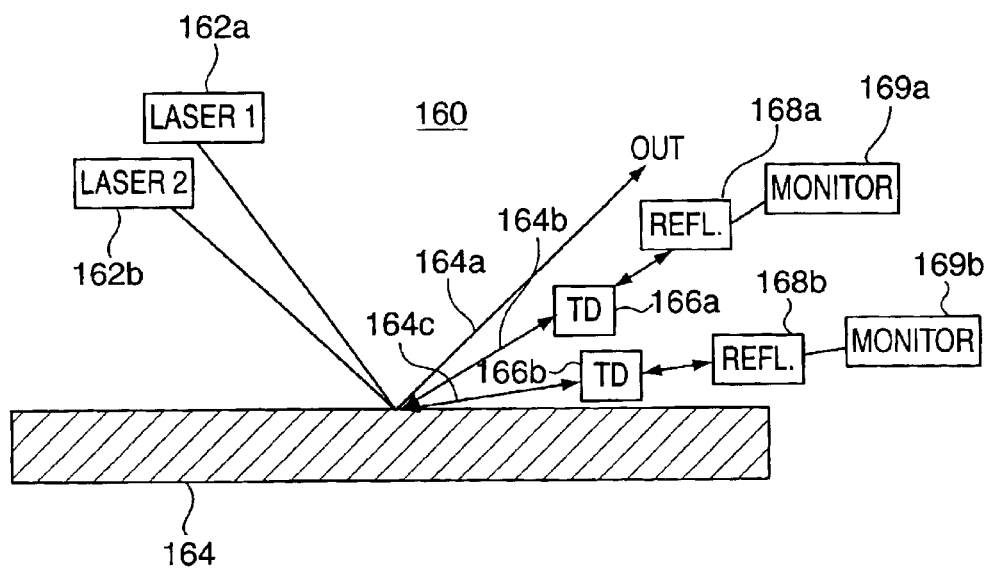
FIG. 19 is a block diagram of an alternative multi-laser system including a diffraction grating and a feedback mechanism for feeding a higher diffraction order diffracted signal from the grating back to the multiple optical radiation sources in accordance with the concept of the second embodiment of the present invention.

Referring now to FIG. 19, there is shown another exemplary implementation of the concept of the laser system 80 of FIG. 13, namely a block diagram of a multi-laser system 160 including multiple individual feedback mechanisms 166a (TD, Time Delay), 166b (TD, Time Delay), 168a (Reflector), 168b (Reflector) in higher diffraction order output/inputs 164b and 164c of an optical transmission filter/multiplexer 164 that provide stabilizing optical feedback signals in one of two respective predetermined polarization states, and within a respective one of two predetermined wavelength bands, to a respective one of two optical radiation sources (LASER 1, LASER 2) 162a and 162b in accordance with the second embodiment of the present invention. In the case of the laser system 160, the transmission filter/multiplexer 164 is a bulk diffraction grating (BDG), whose structure and operation is well known in the art.

The laser system 160 comprises the two optical radiation sources 162a and 162b generating various wavelengths and polarizations, the optical BDG 164 that performs multiplexing and demultiplexing in the optical wavelength and/or polarization domains and comprises a zeroth-order output 164a, a first higher diffraction order output/input 164b connected serially to an optional time delay 166a, a reflector 168a, and an optional optical monitor 169a, a second higher diffraction order output/input 164c connected serially to an optional time delay 166b, a reflector 168b, and an optional optical monitor 169b. The optical radiation sources 162a and 152b, optical BDG 164, optional time delays 166a and 166b, and reflectors 168a and 168b are connected together such that polarization is substantially maintained across each connection point. The output of each of the optical radiation sources 162a and 162b is substantially polarized in a respective linear polarization and these polarizations are substantially aligned to one of the principle polarization axes of the two respective inputs of the BDG 164. If the two stabilized radiation sources 162a and 162b have substantially the same predetermined wavelength band then the polarizations of the respective optical radiation sources 162a and 162b must be substantially aligned to orthogonal principle polarization axes of the respective inputs of the BDG 164.

The optical radiation sources 162a and 162b behave substantially the same as described hereinbefore for the radiation sources 82a–82d of the laser system 80 of FIG. 13. Each of the two inputs of the BDG 164 are designed to pass a major portion of a respective predetermined wavelength band that falls within the predetermined wavelength range of the respective optical radiation sources 162a and 162b to the zeroth-order output 164a of the optical BDG 164, while simultaneously multiplexing these inputs in the optical wavelength and/or polarization domains and transmitting this filtered and composite signal to the zeroth-order output 164a of the BDG 164 as an output of the laser system 160. A minor portion of each of the individual filtered inputs are also passed to individual respective higher diffraction order outputs 164b and 164c of the optical BDG 164 and, in turn, to respective individual optional time delays 166a and 166b, respective individual reflectors 168a and 168b, and respective individual optional monitors 169a and 169b. The respective reflectors 168a and 168b are each arranged to reflect all or a predetermined major first portion of the respective optionally delayed optical signal from the respective optional time delay 166a and 166b, back towards the respective optional time delay 166a and 166b as a respective feedback signal of predetermined polarization and wavelength, and transmit none or a predetermined remaining respective second portion of the respective optionally delayed optical signal to a respective optional signal monitor 169a and 169b such as an optical detector or spectrum analyzer for optionally measuring the spectrum or power in the signal at that location.

The input and reflected optical signals of the reflector 168a and 168b are substantially the same in optical properties as in, for example, polarization and wavelength. The respective individual feedback signals then pass again through the respective optional time delays 166a and 166b and into the optical BDG 164 where the signal are routed by respective wavelength and/or polarization, and directed to the respective two inputs of the BDG 164. Each of the two inputs of the BDG 164 passes only a predetermined band of wavelengths and/or polarization from the incident individual feedback signals to the respective outputs of the two optical radiation sources 162a and 162b. The process of feedback and amplification continues in a manner substantially the same as that described hereinbefore for the laser system 80 of FIG. 13 until a steady state output is achieved for the two optical radiation sources 162a and 162b, the properties of each of which are substantially determined by the two respective inputs of the BDG 164, the two respective individual optional time delays 166a and 166b, the two respective individual reflectors 168a and 168b, and the two respective resonant systems which are formed between the respective high reflectance endfaces of the four optical radiation sources 162a and 162b and the reflectors 168a and 168b. The resultant respective feedback substantially determines the output properties (e.g., wavelength, output optical power and stability over time, and environmental conditions) of the two respective optical radiation sources 162a and 162b.

The laser system 160 shares the fundamental advantages described hereinbefore for the laser system 80 of FIG. 13.

Figure 20:
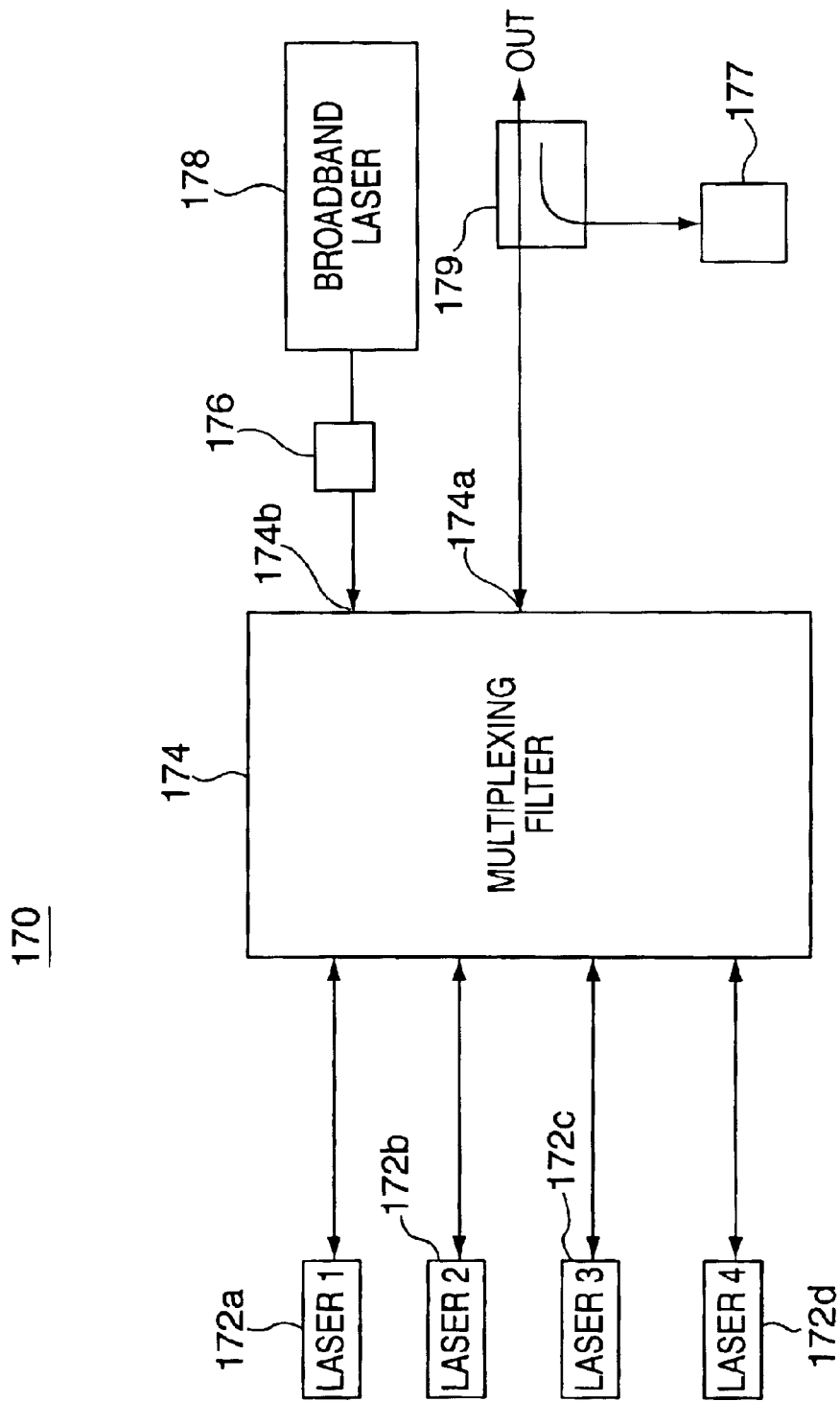
FIG. 20 is a block diagram of an exemplary multi-laser system comprising a multiplexer and a broadband laser located in a secondary or higher diffraction order output of the multiplexer in accordance with a third embodiment of the present invention.

Referring now to FIG. 20, there is shown a block diagram of an exemplary multi-laser system 170 in accordance with a third embodiment of the present invention. The system 170 comprises a first laser 172a, a second optional laser 172b, a third optional laser 172c, a fourth optional laser 172d, a transmission filter/multiplexer 174, and an optional isolator 176 coupled to a broadband (BROADBAND LASER) source 178. The transmission filter/multiplexer 174 functions in the same manner as described hereinbefore for the transmission filter/multiplexers 74, 84, 94, 104, 134, 144, 154, 164, and 7500 shown in FIGS. 12–19 and 10, respectively. The transmission filter/multiplexer 174 can comprise any one of the types of transmission filter/multiplexers 74, 84, 94, 104, 134, 144, 154, 164, and 7500 indicated hereinbefore. The transmission filter/multiplexer 174 outputs a multiplexed signal from the laser 172a–172d to a fundamental output 174a there from. The output signal of 174a is transmitted from the system 170 via an optional optical tap 179 which is coupled to an optical power detector 177 that can be used when high powered lasers 172a–172d are used. The power detector 177 is used for shutting down the system 170 when an output fiber break is detected via measurement of back reflection. Instead of using a reflector or coupled secondary or higher diffraction orders for providing a feedback signal through a transmission filter/multiplexer, as was described and shown hereinbefore for FIGS. 12–19, 10, and 11, respectively, a broadband source 178 is used to transmit a feedback signal via a higher diffraction order or secondary output 174b. The higher diffraction order or secondary output can comprise a single output port 174b in the manner shown in FIGS. 12, 17–19, and 10, or multiple secondary output ports (e.g., 94c and 94d)in the manner shown in FIG. 14. Thereby, through the use of transmission filter/multiplexers such as Asymmetric Mach Zehnder Interferometers (AMZI), an Array Waveguide Grating (AWG), a diffraction grating, a ring resonator, etc., and the broadband laser 178, optical signals in predetermined wavelength bands and polarizations are directed to the associated lasers 172a–172d. In general, an isolator 176 would be incorporated into the optical path from the broadband laser 178 to prevent undesired frequency locking of the broadband laser source 178 to the lasers 172a–172d as this could result in correlation of the optical outputs of the lasers 172a–172d which would decrease the depolarization of the laser system 170 output.

In accordance with the third embodiment, in the system 170 the lasers 172a–172d are injection-locked using a completely independent broadband source 178. Since the broadband source 178 is incoherent or uncorrelated to the set of lasers 172a–172d that need to be stabilized, any need for an optional time delay utilized in the systems 70, 80, 90, 100, 110, 120, 130, 140, 150, 160, and 7000 is eliminated and the broadband laser source 178 could be arbitrarily close to the lasers 172a–172d.

The broadband laser source 178 is preferably a broadband optical source which is either polarized or depolarized to provide feedback to one or more of the lasers 172a–172d. The broadband laser source 178 can comprise any suitable optical sources such as, for example, unpolarized ASE sources, depolarized laser sources, and polarized multimode lasers. The feedback signal from the broadband laser source 178 must be polarized in the same state as that of the lasers 172a–172d.

To achieve stable laser operation, the entire laser system 170 is polarization maintaining in that each of the components comprising the system is polarization maintaining and each of these components can be described from an optical polarization perspective by the identification within each component of two principle axes of polarization which are not equal with respect to effective refractive index and/or optical propagation loss. Furthermore, these components are all relatively orientated and fixed in place such that their principle axes are nominally aligned. If the broadband laser source 178 is polarized, it is necessary to ensure that the polarization state is aligned to the same principle polarization axis as the lasers 172a–172d.

Figure 21:
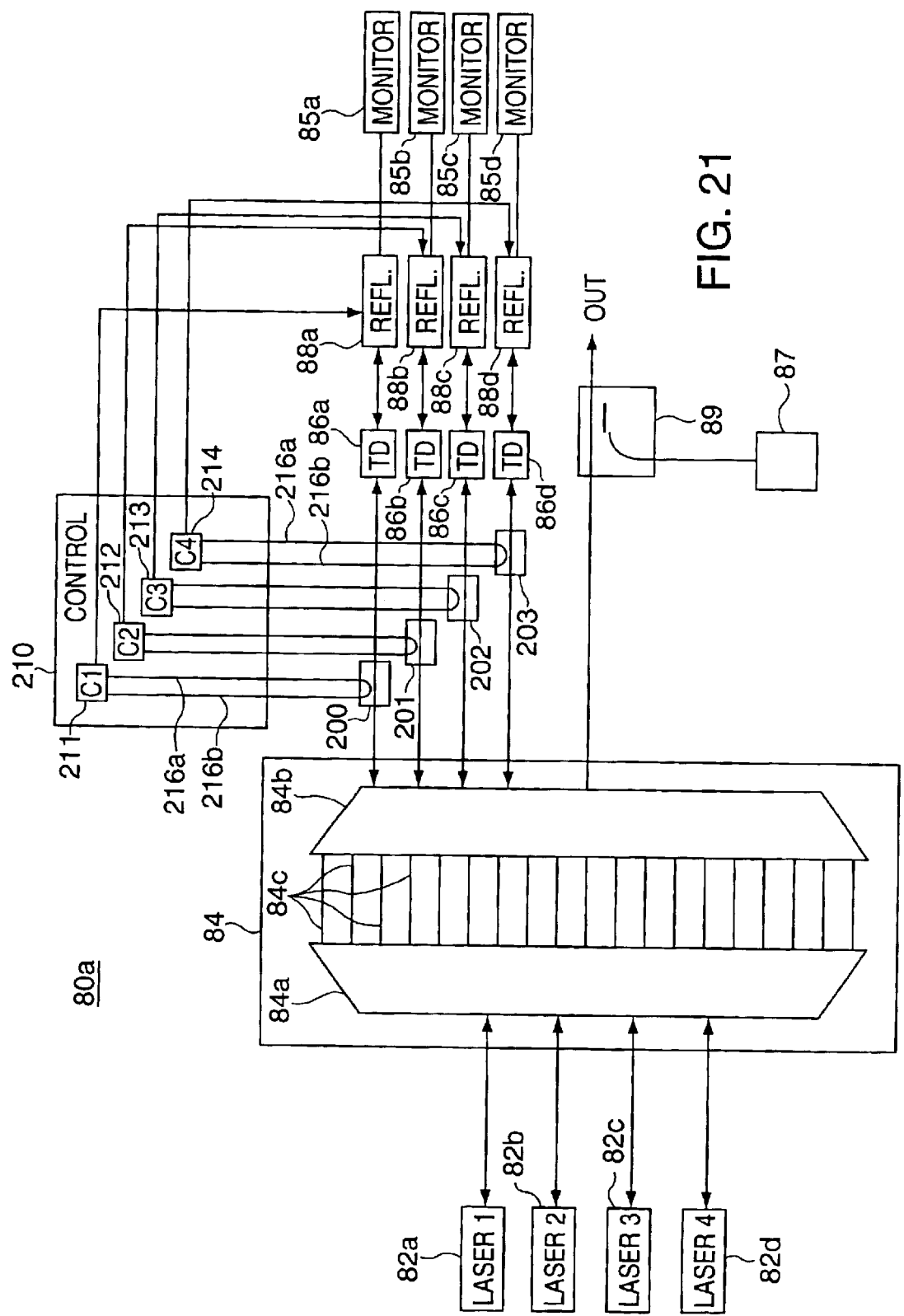
FIG. 21 is a block diagram of a multi-laser system which is similar to the multi-laser system of FIG. 13 that is modified to include directional taps and a control device for controlling the level of feedback in individual feedback paths in accordance with a fourth embodiment of the present invention.

Referring now to FIG. 21, there is shown a block diagram of a multi-laser system 80a which is similar to, and an extension of, the multi-laser system 80 of FIG. 13, and further comprises directional taps 200–203 and a control device (CONTROL) 210 for controlling the level of feedback for the individual feedback paths in accordance with a fourth embodiment of the present invention. The multi-laser system 80a comprises a first laser 82a, a second laser 82b, a third laser 82c, a fourth laser 82d, an AWG transmission filter/multiplexer 84, an optional first time delay (TD) 86a in series with a first reflector (REFL.) 88a, an optional second time delay (TD) 86b in series with a second reflector (REFL.) 88b, an optional third time delay (TD) 86c in series with a third reflector (REFL.) 88c, and an optional fourth time delay (TD) 86d in series with a fourth reflector (REFL.) 88d which function as described hereinbefore for the corresponding elements in FIG. 13. A zeroth-order output (m=0) from the multiplexing transmission filter 84 provides the output from the system 80a, and can include an optical tap 89 in the zeroth diffraction order output optical line which is coupled via an optical tap 89 to a back-reflection monitor 87 for detecting breaks in the system 80a where high powered lasers 82a–82d are used. In the system 80a, a separate optional time delay (TD) (e.g., 86a, 86b, 86c, or 86d) and reflector (e.g., 88a, 88b, 88c, or 88d) is provided in a separate higher diffraction order (m<>0) output from the multiplexing transmission filter 84 for each of the lasers 82a–82d.

In accordance with the fourth embodiment of the present invention, a first directional tap 200 is inserted between a higher diffraction order (m<>0) first output from the transmission filter/multiplexer 84 and the combination of the first time delay (TD) 86a and first reflector 88a corresponding to optical radiation source 82a. A second directional tap 201 is inserted between the same or different higher diffraction order output from the transmission filter/multiplexer 84 and the combination of the second time delay (TD) 86b and the second reflector 88b corresponding to radiation source 82b. A third directional tap 202 is inserted between the same or different higher diffraction order output from the transmission filter/multiplexer 84 and the combination of the third time delay (TD) 86c and third reflector 88c corresponding to optical radiation source 82c. A fourth directional tap 203 is inserted between the same or different higher diffraction order output from the transmission filter/multiplexer 84 and the combination of the fourth time delay (TD) 86d and fourth reflector 88d corresponding to optical radiation source 82d. Each of the directional taps 200–203 functions to direct a portion of power of the demultiplexed laser signal propagating in the associated higher diffraction order output from the transmission filter/multiplexer 84 toward the associated reflector 88a–88d to the control device 210 via a path 216a, and a portion of the power of the reflected signal propagating in the associated higher diffraction order output from the associated reflector 88a–88d toward the transmission filter/multiplexer 84 to the control device 210 via a path 216b. The control device 210 functions to monitor the individual wavelength powers detected by each of directional taps 200–203 and received via the associated paths 216a and 216b in, for example, control subsections (C1–C4) 211–214, respectively. The control device 210 uses the two concurrently received wavelength powers from each of the directional taps 200–203 via the paths 216a and 216b, and generates a separate control signal to each of the reflector 88a–88d using any suitable algorithm. The control subsections 211–214 are shown for descriptive purposes only, and any suitable arrangement may be used in the control device 210 for generating the required control signals to the tunable reflectors 88a–88d. Each of the reflectors 88a–88d are tunable reflectors which are responsive to the associated control signal from the control device 210 to control the variable reflector level and provide a required reflective feedback signal back to the individual associated lasers 82a–82d. The respective reflectors 88a–88d are each arranged to reflect all, or a predetermined major first portion, of the respective optionally delayed optical signal from the respective optional time delay 86a–86d back towards the respective optional time delay 86a–86d as a respective feedback signal of predetermined polarization and wavelength, and transmit none or a predetermined remaining respective second portion of the respective optionally delayed optical signal to a respective optional signal monitor 85a–85d such as an optical detector or spectrum analyzer.

The purpose of the monitors 85a–85d is to allow the measurement of the optical properties of the optical radiation sources 82a–82d so that lifetime and impact on system performance can be continuously updated.

The above described concept of using a directional tap (e.g., 200) to detect both the wavelength power level of a light source found in a demultiplexed feedback signal from a plurality of lasers 82a–82d, and the wavelength power in a feedback signal propagating in a higher diffraction order of a transmission filter/multiplexer 84 to regulate the wavelength power level of the feedback signal to a laser (e.g., 82a) can also be similarly applied to a multiplexed feedback signal as in, for example, the systems 7000, 70, 90, shown in FIGS. 10, 12, and 14, respectively. For example, in system 70 shown in FIG. 12, a directional tap (not shown) can be inserted in the secondary output path between the transmission filter/multiplexer 74 and the time delay 76 in the manner shown, for example, for directional tap 200 in system 80a of FIG. 21. In FIG. 12, the directional tap would concurrently detect the wavelength power level propagating in each direction of the secondary path from output 74e. A control device (not shown in FIG. 12) uses the detected wavelength power signals from the direction tap to generate a control signal to the reflector 78 for regulating the reflected feedback signal similar to that described hereinabove for control device 210 of FIG. 21.

To achieve stable laser operation, the entire laser system 80a is polarization maintaining in that each of the components comprising the system 80a is polarization maintaining in that each of these components can be described from an optical polarization perspective by the identification within each component of two principle axes of polarization which are not equal with respect to effective refractive index and/or optical propagation loss. Furthermore, these components are all relatively orientated and fixed in place such that their principle polarization axes are nominally aligned.

Each of the transmission filters 34 and 5400, transmission filters 3400a–3400n and optical combiner 3500 and transmission filters 6400a–6400n and optical combiner 6500, and transmission filter/multiplexers 4500, 44, 54, 64, 74, 234, 7500, 84, 94, 104, 144, 134, 154, 164, and 174 may be denoted as a transmission filter means or transmission filter device.

It is to be appreciated and understood that the specific embodiments of the present invention that have been described are merely illustrative of the general principles of the present invention. Various modifications may be made by those skilled in the art that are consistent with the principles of the present invention. For example, all lasers shown and described could be a variety of different types of radiation sources. Still further, the monitors can, in addition to being useful for shutting down the respective radiation sources, can alternatively reduce the output power from same.

What is claimed is:

1. Apparatus comprising:
   at least one radiation source, each radiation source selectively generating an output signal at a predetermined wavelength band and polarization;
   a transmission filter means comprising a separate input port coupled to each one of the at least one radiation source, and at least one output port for generating a filtered output signal from the output signal generated by the at least one radiation source;
   a feedback mechanism coupled to at least one of the at least one output port of the transmission filter means for providing a feedback signal that is directed back through the transmission filter means for stabilizing each of the at least one radiation source; and the apparatus is polarization maintaining wherein the at least one radiation source, the transmission filter means, and the feedback mechanism are interconnected such that principle axes of polarization thereof are substantially aligned.

2. The apparatus of claim 1 wherein:

the at least one output port of the transmission filter means comprises a fundamental output port; and the feedback mechanism comprises a reflector means coupled to the fundamental output port of the transmission filter means for passing therethrough a major portion of the filtered output signal received from the fundamental output port as an output signal from the apparatus, and returning a remaining portion of the filtered output signal back through the transmission filter means for delivering the wavelength band and polarization to each of the respective at least one radiation source generating such wavelength band and polarization as a radiation feedback signal.

3. The apparatus of claim 2 further comprising a time delay coupled between the fundamental output port of the transmission filter means and the feedback means.

4. The apparatus of claim 2 further comprising:

a tap coupled to receive the major portion of the filtered output signal from the feedback mechanism for directing a first portion thereof to the output of the apparatus;

a back-reflection monitor coupled to the tap for detecting breaks in a system using the apparatus and reducing the output power of the at least one radiation source when a break is detected; and the at least one radiation source is a high power source.

5. The apparatus of claim 1 wherein the transmission filter means is a transmission filter.

6. The apparatus of claim 1 wherein the transmission filter means is selected from one of a group consisting of a transmission filter, an arrayed waveguide grating, a Mach Zehnder Interferometer, a ring resonator filter, a transmission filter and combiner, a dielectric mirror, a concatenation of dielectric mirrors, a diffraction grating, a grating assisted coupler, a long period grating and an arrayed waveguide grating wavelength and/or polarization multiplexing filter.

7. The apparatus of claim 1 further comprising:

a separate photodetector coupled to each of the separate predetermined input ports of the transmission filter means not coupled to the at least one radiation source for detecting the power in the received wavelength signal, and for generating an output control signal to the one of the at least one radiation source generating such wavelength band and polarized signal for stabilizing that radiation source; and the feedback mechanism comprises a reflector means coupled to a fundamental output port forming one of the at least one output ports of the transmission filter means for passing a major portion of the filtered output signal received from the fundamental output port as an output signal from the apparatus, and returning a remaining portion of the filtered output signal back through the transmission filter means such that wavelength band and polarized signals from each of the at least one radiation source appear at a separate predetermined input port of the transmission filter means which is different than an input port used by the at least one radiation source.

8. The apparatus of claim 7 further comprising a time delay coupled between the fundamental output port of the transmission filter means and the reflector means.

9. The apparatus of claim 1 wherein the at least one radiation source comprises at least a first radiation source and a second radiation source which each generate separate output signals to separate predetermined input ports of the transmission filter means, the output signals from the at least first and second radiation sources being selected from a group consisting of a different wavelength band, a same wavelength band but different polarization from that of another radiation source, and a different wavelength band and a different polarization from that of another radiation source.

10. The apparatus of claim 1 wherein the filtered output signal from a fundamental output port of the transmission filter means is transmitted as an output signal from the apparatus, and the feedback mechanism receives the filtered output signal from a first higher diffraction order output port of the transmission filter means and feeds it back to one of a group consisting of the same first higher diffraction order output port of the transmission filter means, and a different higher diffraction order output port of the transmission filter means.

11. The apparatus of claim 10 further comprising a time delay coupled between the first higher diffraction order output port of the transmission filter means and the feedback means.

12. The apparatus of claim 10 further comprising:

a tap coupled to receive the output signal from the fundamental output port for directing a portion thereof as the output signal of the apparatus; and a back-reflection monitor coupled to the tap for detecting breaks in a system using the apparatus and reducing the output power of the at least one radiation source when a break is detected.

13. The apparatus of claim 10 further comprising:

a separate directional coupler coupled between each feedback means and its associated higher diffraction order output port of the transmission filter means, each directional tap directing a portion of the power of the signal propagating in first and second opposing direction between the transmission filter means and the associated tunable feedback means to first and second output paths, respectively;

a control device coupled to the first and second output paths from each of the directional couplers for comparing power levels thereof and generating therefrom control output signals to any one of the tunable feedback means for regulating the feedback signal therefrom;

the transmission filter means is designed to further comprise a separate higher diffraction order output port for receiving the signal from a separate one of each of the at least one radiation sources; and the feedback mechanism comprises a separate tunable feedback means coupled to each of the higher diffraction order output ports, each feedback means receiving the wavelength output signal from a separate higher diffraction order output port via a separate optical path and feeds it back to the same respective higher diffraction order output port of the transmission filter means.

14. The apparatus of claim 1 wherein:

the filtered output signal from the fundamental output port of the transmission filter means is transmitted as an output signal from the apparatus; and the feedback mechanism receives the filtered output signal from a first secondary output port of the transmission filter means and feeds it back to one of a group consisting of the same first secondary output port of the transmission filter means and a different secondary output port of the transmission filter means.

15. The apparatus of claim 14 further comprising a time delay coupled between the first secondary output port of the transmission filter means and the feedback means.

16. The apparatus of claim 14 further comprising:
a tap coupled to receive the output signal from the fundamental output port for directing a first portion thereof as the output signal of the apparatus; and
a back-reflection monitor coupled to the tap for detecting breaks in a system using the apparatus and reducing the output power of the at least one radiation source when a break is detected.

17. The apparatus of claim 1 wherein the feedback mechanism is a broadband radiation source coupled to one of a group consisting of a higher diffraction order output port and a secondary output port of the transmission filter means for generating a filtered wavelength feedback signal back through the transmission filter means to at least one of the at least one radiation source.

18. The apparatus of claim 1 wherein the feedback mechanism is one of a group consisting of (a) a separate feedback means for each radiation source which is coupled to a separate predetermined higher diffraction order output port of the transmission filter means, and (b) both a feedback loop coupling a predetermined higher diffraction order output port of the transmission filter means corresponding to the at least one radiation source to a separate predetermined diffraction order output port of the transmission filter means corresponding to a feedback location to separate feedback means, and separate feedback means for each of the at least one radiation source where the feedback means are coupled to predetermined separate input ports of the transmission filter means which are different from the predetermined input ports used by the at least one radiation source.

19. The apparatus of claim 18 further comprising:
a tap coupled to receive the major portion of the filtered output signal from the feedback mechanism for directing a first portion thereof to the output of the apparatus; and
a back-reflection monitor coupled to the tap for detecting breaks in a system using the apparatus and reducing the output power of the at least one radiation source when a break is detected.

20. The apparatus of claim 18 further comprising separate time delays coupled between the predetermined diffraction order output ports of the transmission filter means and the separate feedback means.

21. The apparatus of claim 1 being an optical system.

22. Apparatus comprising:
at least a first and a second radiation source, each radiation source selectively generating an output signal from one of a group consisting of a different wavelength band, a same wavelength band and a different polarization from that of another radiation source, and a different wavelength band and a different polarization from that of another radiation source;
a transmission filter/multiplexer comprising at least one output port, and a separate input port coupled to each one of the at least first and second radiation sources for multiplexing and filtering the received output signals from the at least first and second radiation sources and generating a multiplexed output signal therefrom at the at least one output port;
a feedback mechanism coupled to at least one of the at least one output port of the transmission filter/multiplexer for generating a feedback signal that is directed back through the transmission filter/multiplexer for stabilizing the at least first and second radiation sources; and
the apparatus is polarization maintaining wherein the at least first and second radiation sources, the transmission filter/multiplexer, and the feedback mechanism are interconnected such that principle axes of polarization thereof are substantially aligned.

23. The apparatus of claim 22 wherein:
the at least one output port of the transmission filter/multiplexer comprises a fundamental output port; and
the feedback mechanism comprises a reflector means coupled to the fundamental output port of the transmission filter/multiplexer for passing therethrough a major portion of the multiplexed output signal received from the fundamental output port as an output signal from the apparatus, and returning a remaining portion of the multiplexed output signal back through the transmission filter/multiplexer for demultiplexing the wavelength bands and polarization in the returned remaining portion, and transmitting the associated demultiplexed wavelength band and polarized signals to the at least first and second radiation sources generating such wavelength band and polarization as a radiation feedback signal.

24. The apparatus of claim 23 further comprising a time delay coupled between the fundamental output port of the transmission filter/multiplexer and the feedback means.

25. The apparatus of claim 23 further comprising:
a tap coupled to receive the major portion of the multiplexed output signal from the feedback mechanism for directing a first portion thereof to the output of the apparatus;
a back-reflection monitor coupled to the tap for detecting breaks in a system using the apparatus and reducing the output power of the at least first and second radiation sources when a break is detected; and
at least one of the at least first and second radiation sources is a high power source.

26. The apparatus of claim 22 wherein the transmission filter/multiplexer is selected from one of a group consisting of an arrayed waveguide grating, a Mach Zehnder Interferometer, a ring resonator filter, a transmission filter and an optical combiner, a dielectric mirror, a concatenation of dielectric mirrors, a grating assisted coupler, a diffraction grating, and an arrayed waveguide grating wavelength and/or polarization multiplexing filter.

27. The apparatus of claim 22 further comprising:
a separate photodetector coupled to each of the separate predetermined input ports of the transmission filter means not coupled to the at least first and second radiation sources for detecting the power in the received wavelength signal, and for generating an output control signal to the one of the at least first and second radiation sources generating such wavelength band and polarized signal for stabilizing that radiation source; and
the feedback mechanism comprises a reflector means coupled to a fundamental output port forming one of the at least one output ports of the transmission filter/multiplexer for passing a major portion of the multiplexed output signal received from the fundamental output port as an output signal from the apparatus, and returning a remaining portion of the multiplexed output signal back through the transmission filter/multiplexer such that wavelength band and polarized signals from each of the first and second radiation sources are demultiplexed and appear at separate predetermined input ports of the transmission filter/multiplexer which are different than input ports used by the at least first and second radiation sources.

28. The apparatus of claim 27 further comprising a time delay coupled between the fundamental output port of the transmission filter means and the reflector means.

29. The apparatus of claim 22 wherein:

the multiplexed output signal from a fundamental output port of the transmission filter/multiplexer is transmitted as an output signal from the apparatus; and the feedback mechanism receives the multiplexed output signal from a first higher diffraction order output port of the transmission filter/multiplexer and feeds it back to one of a group consisting of the same first higher diffraction order output port of the transmission filter/multiplexer, and a different higher diffraction order output port of the transmission filter/multiplexer.

30. The apparatus of claim 29 further comprising a time delay coupled between the first higher diffraction order output port of the transmission filter/multiplexer means and the feedback means.

31. The apparatus of claim 29 further comprising:

a tap coupled to receive the output signal from the fundamental output port for directing a first portion thereof as the output signal of the apparatus;

a back-reflection monitor coupled to the tap for receiving a remaining portion of the output signal from the fundamental output port from the tap and detecting breaks in a system using the apparatus and reducing the output power of the at least one radiation source when a break is detected; and at least one of the at least first and second radiation sources is a high power source.

32. The apparatus of claim 29 further comprising:

a separate directional coupler coupled between each feedback means and its associated higher diffraction order output port of the transmission filter/multiplexer, each directional tap directing a portion of the power of the signal propagating in first and second opposing direction between the transmission filter/multiplexer and the associated tunable feedback means to first and second output paths, respectively;

a control device coupled to the first and second output paths from each of the directional couplers for comparing power levels thereof and generating therefrom control output signals to any one of the tunable feedback means for regulating the feedback signal therefrom;

the transmission filter/multiplexer is designed to further comprise a separate higher diffraction order output port for receiving the signal from a separate one of each of the at least first and second radiation sources; and the feedback mechanism comprises a separate tunable feedback means coupled to each of the higher diffraction order output ports, each feedback means receiving the wavelength output signal from a separate higher diffraction order output port via a separate optical path and feeds it back to the same higher diffraction order output port of the transmission filter/multiplexer.

33. The apparatus of claim 22 wherein:

the multiplexed output signal from the fundamental output port of the transmission filter/multiplexer is transmitted as an output signal from the apparatus; and the feedback mechanism receives the multiplexed output signal from a first secondary output port of the transmission filter/multiplexer and feeds it back to one of a group consisting of the same first secondary output port of the transmission filter/multiplexer and a different secondary output port of the transmission filter/multiplexer.

34. The apparatus of claim 33 further comprising a time delay coupled between the first secondary output port of the transmission filter multiplexer and the feedback means.

35. The apparatus of claim 33 further comprising:

a tap coupled to receive the output signal from the fundamental output port for directing a first portion thereof as the output signal of the apparatus; and a back-reflection monitor coupled to the tap for detecting breaks in a system using the apparatus and reducing the output power of at least one of the at least first and second radiation sources when a break is detected.

36. The apparatus of claim 27 wherein the feedback mechanism is a broadband radiation source coupled to one of a group consisting of a higher diffraction order output port and a secondary output port of the transmission filter/multiplexer for generating a filtered wavelength feedback signal to at least one of the at least first and second radiation sources.

37. The apparatus of claim 22 wherein the feedback mechanism comprises one of a group consisting of (a) a separate feedback means for each radiation source which is coupled to a separate predetermined higher diffraction order output port of the transmission filter/multiplexer, and (b) both a feedback loop coupling a predetermined higher diffraction order output port of the transmission filter/multiplexer corresponding to the at least first and second radiation sources to a separate predetermined diffraction order output port of the transmission filter means corresponding to a feedback location to separate at least first and second feedback means, and separate feedback means for each of the at least first and second radiation sources where the feedback means are coupled to predetermined separate input ports of the transmission filter/multiplexer which are different from the predetermined input ports used by the at least first and second radiation sources.

38. The apparatus of claim 37 further comprising a time delay coupled within the feedback loop connecting the predetermined diffraction order output ports.

39. The apparatus of claim 22 being an optical system.

* * * * *